(12) United States Patent
Brambilla et al.

(10) Patent No.: US 9,218,917 B2
(45) Date of Patent: Dec. 22, 2015

(54) ENERGY STORAGE MEDIA FOR ULTRACAPACITORS

(75) Inventors: Nicolò Michele Brambilla, Boston, MA (US); Fabrizio Martini, Boston, MA (US); Kavya Ramachandra, Somerville, MA (US); Riccardo Signorelli, Boston, MA (US); Oscar Enrique Corripio Luna, Boston, MA (US)

(73) Assignee: FastCAP Sysems Corporation

( * ) Notice: Subject to any disclaimer, the term of this patent is extended or adjusted under 35 U.S.C. 154(b) by 383 days.

(21) Appl. No.: 13/491,593

(22) Filed: Jun. 7, 2012

(65) Prior Publication Data

US 2012/0313591 A1 Dec. 13, 2012

Related U.S. Application Data

(60) Provisional application No. 61/494,164, filed on Jun. 7, 2011, provisional application No. 61/524,071, filed on Aug. 16, 2011, provisional application No. 61/525,326, filed on Aug. 19, 2011, provisional application No. 61/568,450, filed on Dec. 8, 2011, provisional application No. 61/569,010, filed on Dec. 9, 2011, provisional application No. 61/570,587, filed on Dec. 14, 2011, provisional application No. 61/602,121, filed on Feb. 23, 2012.

(51) Int. Cl.
*H02J 7/34* (2006.01)
*H01G 11/36* (2013.01)
(Continued)

(52) U.S. Cl.
CPC .............. *H01G 11/36* (2013.01); *B82Y 30/00* (2013.01); *B82Y 40/00* (2013.01); *C01B 31/0233* (2013.01); *H01G 11/28* (2013.01); *H01G 11/68* (2013.01); *C01B 2202/04* (2013.01); *C01B 2202/32* (2013.01); *C01B 2202/34* (2013.01); *C01B 2202/36* (2013.01); *H01G 9/155* (2013.01); *H01G 9/2004* (2013.01); *H01G 9/2009* (2013.01); *H01G 9/2013* (2013.01); *H01G 9/2018* (2013.01); *H01G 11/84* (2013.01); *H02J 7/345* (2013.01); *Y02E 60/13* (2013.01)

(58) Field of Classification Search
CPC ... H01G 9/2004; H01G 9/155; H01G 9/2009; H01G 9/2013; H01G 9/2018; H02J 7/345
USPC .................. 361/500, 502–502; 320/166–167
See application file for complete search history.

(56) References Cited

U.S. PATENT DOCUMENTS

| | | |
|---|---|---|
| 3,982,182 A | 9/1976 | Hogg |
| 4,349,910 A | 9/1982 | Belz |

(Continued)

FOREIGN PATENT DOCUMENTS

| | | |
|---|---|---|
| EP | 2056312 A1 | 5/2009 |
| JP | 2003133185 A | 5/2003 |

(Continued)

OTHER PUBLICATIONS

International Search Report from PCT/US2007/068314, mailed Feb. 13, 2008.

(Continued)

*Primary Examiner* — Stacy Whitmore
(74) *Attorney, Agent, or Firm* — Wolf Greenfield & Sacks, P.C.

(57) ABSTRACT

An ultracapacitor includes at least one electrode that includes carbon nanotubes. The carbon nanotubes may be applied in a variety of ways, and a plurality of layers may be included. Methods of fabrication of carbon nanotubes and ultracapacitors are provided.

48 Claims, 18 Drawing Sheets

(51) Int. Cl.
  *H01G 9/00* (2006.01)
  *H01G 9/20* (2006.01)
  *B82Y 40/00* (2011.01)
  *C01B 31/02* (2006.01)
  *B82Y 30/00* (2011.01)
  *H01G 11/28* (2013.01)
  *H01G 11/68* (2013.01)
  *H01G 11/84* (2013.01)

(56) References Cited

U.S. PATENT DOCUMENTS

| | | | |
|---|---|---|---|
| 4,408,259 A | 10/1983 | Muranaka et al. | |
| 4,934,366 A | 6/1990 | Truex et al. | |
| 5,426,561 A * | 6/1995 | Yen et al. | 361/502 |
| 5,440,447 A | 8/1995 | Shipman et al. | |
| 5,441,827 A | 8/1995 | Gratzel et al. | |
| 5,476,709 A | 12/1995 | Inoue et al. | |
| 5,711,988 A | 1/1998 | Tsai et al. | |
| 5,905,629 A * | 5/1999 | Alford | 361/502 |
| 5,923,619 A | 7/1999 | Knapen et al. | |
| 6,059,847 A | 5/2000 | Farahmandi et al. | |
| 6,060,424 A * | 5/2000 | Alford | 502/416 |
| 6,193,779 B1 | 2/2001 | Reichert et al. | |
| 6,205,016 B1 | 3/2001 | Niu | |
| 6,232,706 B1 | 5/2001 | Dai et al. | |
| 6,257,332 B1 | 7/2001 | Vidrine et al. | |
| 6,304,427 B1 | 10/2001 | Reed et al. | |
| 6,350,488 B1 | 2/2002 | Lee et al. | |
| 6,388,423 B1 | 5/2002 | Schilleci, Jr. | |
| 6,413,285 B1 | 7/2002 | Chu et al. | |
| 6,444,326 B1 | 9/2002 | Smith | |
| 6,454,816 B1 | 9/2002 | Lee et al. | |
| 6,491,848 B1 | 12/2002 | Sato et al. | |
| 6,511,760 B1 | 1/2003 | Barone et al. | |
| 6,514,113 B1 | 2/2003 | Lee et al. | |
| 6,565,701 B1 | 5/2003 | Jerabek et al. | |
| 6,665,169 B2 * | 12/2003 | Tennent et al. | 361/303 |
| 6,764,874 B1 | 7/2004 | Zhang et al. | |
| 6,843,119 B2 | 1/2005 | Patey et al. | |
| 6,872,681 B2 | 3/2005 | Niu et al. | |
| 6,906,911 B2 | 6/2005 | Ikeda et al. | |
| 6,914,341 B1 | 7/2005 | McIntyre | |
| 6,924,059 B1 | 8/2005 | Kawakami et al. | |
| 6,962,823 B2 | 11/2005 | Empedocles et al. | |
| 7,070,833 B2 | 7/2006 | Smith et al. | |
| 7,126,207 B2 | 10/2006 | Mosley et al. | |
| 7,201,627 B2 | 4/2007 | Ohnuma | |
| 7,327,556 B2 | 2/2008 | Ro et al. | |
| 7,335,395 B2 * | 2/2008 | Ward et al. | 427/198 |
| 7,381,367 B1 | 6/2008 | Baker et al. | |
| 7,511,941 B1 | 3/2009 | Gallay et al. | |
| 7,699,102 B2 | 4/2010 | Storm et al. | |
| 7,785,558 B2 * | 8/2010 | Hikata | 423/447.3 |
| 7,897,209 B2 | 3/2011 | Shibuya et al. | |
| 7,982,439 B2 | 7/2011 | Trainor et al. | |
| 7,999,695 B2 | 8/2011 | Rodney et al. | |
| 8,025,971 B2 | 9/2011 | Maeno et al. | |
| 8,168,331 B2 | 5/2012 | Best et al. | |
| 8,531,818 B2 | 9/2013 | Hashimoto et al. | |
| 8,760,851 B2 | 6/2014 | Signorelli et al. | |
| 2001/0006108 A1 | 7/2001 | Brett | |
| 2002/0043369 A1 | 4/2002 | Vinegar et al. | |
| 2002/0159943 A1 | 10/2002 | Smalley et al. | |
| 2002/0177018 A1 | 11/2002 | Fuglevand | |
| 2003/0003359 A1 | 1/2003 | Banno et al. | |
| 2003/0027038 A1 | 2/2003 | Tsukamoto et al. | |
| 2003/0030969 A1 | 2/2003 | Farahmandi et al. | |
| 2003/0081372 A1 | 5/2003 | Nakazawa et al. | |
| 2004/0131937 A1 | 7/2004 | Chen et al. | |
| 2004/0188350 A1 | 9/2004 | Beste et al. | |
| 2004/0229117 A1 | 11/2004 | Mitani et al. | |
| 2005/0152096 A1 | 7/2005 | Farahmandi et al. | |
| 2005/0208207 A1 | 9/2005 | Hinoki et al. | |
| 2005/0230270 A1 | 10/2005 | Ren et al. | |
| 2005/0231893 A1 * | 10/2005 | Harvey | 361/502 |
| 2005/0234177 A1 | 10/2005 | Zaghib et al. | |
| 2005/0238810 A1 | 10/2005 | Scaringe et al. | |
| 2005/0250052 A1 * | 11/2005 | Nguyen | 430/322 |
| 2006/0019168 A1 | 1/2006 | Li et al. | |
| 2006/0115722 A1 | 6/2006 | Kim | |
| 2006/0194102 A1 | 8/2006 | Keshishian et al. | |
| 2006/0241236 A1 * | 10/2006 | Kuznetsov et al. | 524/495 |
| 2006/0256506 A1 | 11/2006 | Konuma et al. | |
| 2006/0279906 A1 | 12/2006 | Stemen et al. | |
| 2007/0015336 A1 | 1/2007 | Farahmandi et al. | |
| 2007/0076349 A1 | 4/2007 | Dementiev et al. | |
| 2007/0097598 A1 | 5/2007 | Siggel et al. | |
| 2007/0146965 A1 | 6/2007 | Mitchell et al. | |
| 2007/0188977 A1 | 8/2007 | Takeda et al. | |
| 2007/0254213 A1 | 11/2007 | Best et al. | |
| 2007/0258192 A1 * | 11/2007 | Schindall et al. | 361/503 |
| 2007/0258193 A1 | 11/2007 | Zhong et al. | |
| 2007/0259216 A1 | 11/2007 | Logan | |
| 2007/0292746 A1 | 12/2007 | Sloop | |
| 2008/0013224 A1 | 1/2008 | Kim et al. | |
| 2008/0068801 A1 | 3/2008 | Wilk | |
| 2008/0083626 A1 | 4/2008 | Kubo et al. | |
| 2008/0090183 A1 | 4/2008 | Zhu et al. | |
| 2008/0094777 A1 | 4/2008 | Itahashi et al. | |
| 2008/0192407 A1 | 8/2008 | Lu et al. | |
| 2008/0304207 A1 * | 12/2008 | Brandon et al. | 361/502 |
| 2008/0316678 A1 | 12/2008 | Ehrenberg et al. | |
| 2008/0317660 A1 * | 12/2008 | Pan et al. | 423/447.2 |
| 2009/0011330 A1 | 1/2009 | Onodera et al. | |
| 2009/0021890 A1 | 1/2009 | Bourcier et al. | |
| 2009/0250409 A1 | 10/2009 | Fiene et al. | |
| 2009/0272935 A1 * | 11/2009 | Hata et al. | 252/70 |
| 2009/0272946 A1 | 11/2009 | Lu | |
| 2009/0294753 A1 | 12/2009 | Hauge et al. | |
| 2009/0303658 A1 | 12/2009 | Hiroyuki et al. | |
| 2010/0046142 A1 | 2/2010 | Aitchison et al. | |
| 2010/0119934 A1 | 5/2010 | Ushio et al. | |
| 2010/0134955 A1 | 6/2010 | O'Connor et al. | |
| 2010/0178564 A1 * | 7/2010 | Asari et al. | 429/231.8 |
| 2010/0195269 A1 * | 8/2010 | Kim et al. | 361/502 |
| 2010/0196600 A1 | 8/2010 | Shibuya et al. | |
| 2010/0196758 A1 * | 8/2010 | Hojo et al. | 429/207 |
| 2010/0259866 A1 * | 10/2010 | Shaffer et al. | 361/502 |
| 2011/0080689 A1 | 4/2011 | Bielawski et al. | |
| 2011/0085285 A1 | 4/2011 | Zednicek et al. | |
| 2011/0091767 A1 * | 4/2011 | Hojo et al. | 429/188 |
| 2011/0102002 A1 * | 5/2011 | Riehl et al. | 324/693 |
| 2011/0141661 A1 | 6/2011 | Muthu et al. | |
| 2011/0143197 A1 * | 6/2011 | Ohtsuka et al. | 429/207 |
| 2011/0150736 A1 | 6/2011 | Hagiwara et al. | |
| 2011/0151317 A1 | 6/2011 | Giroud et al. | |
| 2011/0170236 A1 | 7/2011 | Young | |
| 2011/0170237 A1 * | 7/2011 | Brandon et al. | 361/502 |
| 2011/0262772 A1 * | 10/2011 | Hauge et al. | 428/688 |
| 2012/0099244 A1 * | 4/2012 | Lee et al. | 361/502 |
| 2012/0122020 A1 | 5/2012 | Hata et al. | 429/532 |
| 2012/0154979 A1 * | 6/2012 | Signorelli et al. | 361/502 |
| 2012/0231270 A1 | 9/2012 | Dhinojwala et al. | 428/354 |
| 2012/0251432 A1 | 10/2012 | Cooper et al. | 423/447.3 |
| 2012/0257326 A1 * | 10/2012 | Gadkaree et al. | 361/502 |
| 2012/0313586 A1 | 12/2012 | Signorelli et al. | |
| 2013/0029215 A1 | 1/2013 | Signorelli et al. | |
| 2013/0044405 A1 | 2/2013 | Brambilla et al. | |
| 2013/0045157 A1 | 2/2013 | Brambilla et al. | |
| 2013/0141840 A1 | 6/2013 | Cooley et al. | |
| 2013/0189580 A1 * | 7/2013 | Dai et al. | 429/221 |
| 2014/0016246 A1 * | 1/2014 | Gadkaree et al. | 361/502 |
| 2014/0042988 A1 | 2/2014 | Kuttipillai | |
| 2014/0057164 A1 | 2/2014 | Brambilla et al. | |
| 2014/0104754 A1 * | 4/2014 | Lipka et al. | 361/502 |
| 2014/0186550 A1 * | 7/2014 | Cooper et al. | 427/577 |
| 2014/0265565 A1 | 9/2014 | Cooley et al. | |

(56) References Cited

U.S. PATENT DOCUMENTS

2014/0265580 A1 9/2014 Cooley et al.
2014/0299359 A1* 10/2014 Mittal et al. ............. 174/251

FOREIGN PATENT DOCUMENTS

WO 9966985 A2 12/1999
WO 2008016990 A2 2/2008

OTHER PUBLICATIONS

International Search Report from PCT/US2012/039342, mailed Dec. 6, 2012.
International Search Report from PCT/US2012/041438, mailed Nov. 19, 2012.
International Search Report from PCT/US2012/045994, mailed Jan. 25 2013.
International Search Report from PCT/US2012/047474, mailed Jan. 31, 2013.
International Search Report from PCT/US2013/027697, mailed Jun. 26, 2013.
International Search Report from PCT/US2014/02992, mailed Oct. 7, 2014.
International Search Report from PCT/US2014/030310, mailed Oct. 10, 2014.
Notice of Allowance dated May 1, 2014, U.S. Appl. No. 12/928,896.
Office Action dated Dec. 11, 2013, U.S. Appl. No. 12/928,897.
Office Action dated Jul. 16, 2014, U.S. Appl. No. 12/928,897.
Office Action dated Jun. 18, 2014 , U.S. Appl. No. 131588,452.
Office Action dated May 29, 2014, U.S. Appl. No. 13/560,628.
Office Action dated Oct. 15, 2014, U.S. Appl. No. 131587,037.
Written Opinion of the International Searching Authority from PCT/US2007/068314, mailed Feb. 13, 2008.
Written Opinion of the International Searching Authority from PCT/US2012/039342, mailed Dec. 6, 2012.
Written Opinion of the International Searching Authority from PCT/US2012/041438, mailed Nov. 19, 2012.
Written Opinion of the International Searching Authority from PCT/US2012/045994, mailed Dec. 26, 2012.
Written Opinion of the International Searching Authority from PCT/US2012/047474, mailed Jan. 27, 2014.
Written Opinion of the International Searching Authority from PCT/US2013/027697, mailed Jun. 26, 2013.
Written Opinion of the International Searching Authority from PCT/US2012/027697, mailed Mar. 25, 2013.
International search Report of the International Searching Authority from PCT/US2012/027697, mailed Mar. 21, 2013.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Emmenegger, et al., "Investigation of Electrochemical Double-layer {ECOL} Capacitors Electrodes Based on Carbon Nanotubes and Activated Carbon Materials," J. of Power Sources, 2003, pp. 321-329, vol. 124.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Hyeok, et al., "Electrochemical Properties of High-Power Supercapacitors Using Single-Walled Carbon Nanotube Electrodes," Adv. Funct. Mater., Oct. 2001, 387-392, vol. 11, No. 5.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007.
Liu, et al., "Graphene-Based Supercapacitor with an Ultrahigh Energy Density," Nano Lett., pp. 4863-4868, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Murakami, et al., "Growth of Vertically Aligned Single-walled Carbon Nanotube Films on Quartz Substrates and Their Optical Anisotropy," Chem. Phys. Lett., 2004, pp. 298-303, vol. 385.
Ngo, et al., "Thermal properties of imidazolium ionic liquids," Thermochimica Acta, pp. 97-102, 2000, vol. 357-358.
Nishida, et al., "Physical and electrochemical properties of 1-alkyl-3-methylimidazolium tetrafluoroborate for electrolyte," J. Fluorine Chem., pp. 135-141, 2003, vol. 120.
Niu, et al., "High Power Electrochemical Capacitors Based on Carbon Nanotube Electrodes," Appl. Phys. Lett., Mar. 17, 1997, pp. 1480-1482, vol. 70, No. 11.
Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoromethylsulfonyl)imide," J. Mol. Liq., pp. 43-50, Aug. 24, 2010, vol. 157.
Signorelli, et al., "Carbon Nanotube Enhanced Ultracapacitor", Sep. 2004.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.
Wongwiriyapan, et al., "Direct Grotwh of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
Schneuwly, et al. "Properties of supercapacitors From the state-of-the-ar to future trends" Proc. PCIM 2000.

* cited by examiner

ENERGY STORAGE MEDIA FOR ULTRACAPACITORS

CROSS REFERENCE TO RELATED APPLICATIONS

This application is filed under 35 U.S.C. §111(a), and claims priority under 35 U.S.C. §119(e) to U.S. Provisional Patent Application Nos. 61/494,164, filed Jun. 7, 2011; 61/524,071, filed Aug. 16, 2011; 61/525,326, filed Aug. 19, 2011; 61/568,450, filed Dec. 8, 2011; 61/569,010 filed Dec. 9, 2011; 61/570,587 filed Dec. 14, 2011; and 61/602,121 filed Feb. 23, 2012, the entire disclosures of which are incorporated by reference herein in their entirety.

STATEMENT OF FEDERALLY SPONSORED RESEARCH

This invention was made with government support under grant DE-AR0000035/0001 awarded by the Unites States Department of Energy (ARPA-E). The United States government has certain rights in the invention.

BACKGROUND OF THE INVENTION

1. Field of the Invention

The invention generally relates to capacitors, and more specifically to carbon nanotubes for use therein.

2. Description of the Related Art

Carbon nanotubes (hereinafter referred to also as "CNTs") are carbon structures that exhibit a variety of properties. Many of the properties suggest opportunities for improvements in a variety of technologies. For example, technologies that benefit from increased strength, conductivity or capacitance will benefit from the use of CNT. Accordingly, advances in CNT technology are of great interest to those working with capacitors.

Capacitors are one of the key components in a variety of electric systems. Functions include power buffering, energy storage, and voltage smoothing. A variety of industries present demanding requirements for capacitors.

Consider, for example, that industries such as automotive, manufacturing, aerospace, aviation, medical, and military have some applications that require capacitors to provide energy or power support for electrified drive, pulse power, or process actuation. Energy capacity and power capability are key requirements in typical applications within those industries. Applications such as providing torque assist in electrified drivetrains, power-assist for motor drives in manufacturing plants, or voltage support during high power load demands, require substantial energy and power. Some applications present limited physical space or upper bounds on weight. Some applications require long cycle life.

Thus, capacitors used in industrial environments must meet demands for performance while meeting physical constraints. For designers and producers of utlracapacitors, one of the attendant challenges is obtaining an electrode that will function at a desired output.

Thus, what are needed are methods and apparatus for production of a high power electrode based on carbon nanotubes. Preferably, the methods and apparatus are simple to perform and thus offer reduced cost of manufacture, as well as an improved rate of production. Preferably, the methods and apparatus provide for electrodes for ultracapacitors that perform well in demanding situations. Preferably, the electrodes provide stable conductivity and low internal resistance over a wide range of temperatures.

SUMMARY OF THE INVENTION

Methods and apparatus for fabrication of carbon nanotubes are provided. The methods and apparatus provide for carbon nanotubes that exhibit superior characteristics, and therefore performance when used in a variety of applications. A variety of forms of electrodes and ultracapacitors may be realized as a result.

In one embodiment, a method of producing an aggregate of vertically aligned carbon nanotubes is provided. The method includes loading a base material into a substantially oxygen free environment; disposing a catalyst onto the base material to provide a substrate; subjecting the substrate to a raw material gas and heating at least one of the raw material gas and the substrate for growing the aggregate onto the substrate; and cooling the aggregate in a substantially oxygen free environment.

In another embodiment, an apparatus for producing an aggregate of vertically aligned carbon nanotubes, is provided. The apparatus includes a loader section for loading a base material into a substantially oxygen free environment; a sputterer section for disposing a catalyst onto the base material to provide a substrate; a carbon deposition section for subjecting the substrate to a raw material gas and heating at least one of the raw material gas and the substrate for growing the aggregate onto the substrate; and a cooler section for cooling the aggregate in a substantially oxygen free environment.

In another embodiment, a method of producing an electrode for an ultracapacitor, the electrode including an aggregate of vertically aligned carbon nanotubes is provided. The method includes selecting aggregate that has been fabricated by loading a base material into a substantially oxygen free environment; disposing a catalyst onto the base material to provide a substrate; subjecting the substrate to a raw material gas and heating at least one of the raw material gas and the substrate to grow the aggregate thereon; cooling the aggregate in a substantially oxygen free environment; and one of joining the aggregate with a current collector, removing the aggregate from the substrate and disposing a current collector onto the aggregate and combining the aggregate with other carbonaceous material an joining the combination with a current collector.

In another embodiment, a method of producing an electrode for an energy storage system is provided. The method includes selecting a substrate including a thickness of vertically aligned carbon nanotubes (CNT) disposed thereon; disposing a bonding layer onto the thickness of CNT; bonding the bonding layer to a current collector; and removing the substrate from the CNT to provide the electrode.

In another embodiment, a method of producing an ultracapacitor, the ultracapacitor including at least one electrode including an aggregate of vertically aligned carbon nanotubes is provided. The method includes selecting an electrode that has been fabricated by selecting aggregate that has been fabricated by loading a base material into a substantially oxygen free environment; disposing a catalyst onto the base material to provide a substrate; subjecting the substrate to a raw material gas and heating at least one of the raw material gas and the substrate to grow the aggregate thereon; cooling the aggregate in a substantially oxygen free environment; and one of transferring the aggregate onto a current collector, removing the aggregate from the substrate and disposing a current collector onto the aggregate and combining the aggregate with other carbonaceous material on a current collector to provide the electrode; and incorporating the electrode into the ultracapacitor.

In another embodiment, a method of producing an electrode for an energy storage system is provided. The method includes selecting a base including a current collector and a first joining layer disposed over the current collector; and joining a second joining layer to the first joining layer, the second joining layer including a carbonaceous layer disposed thereon, the carbonaceous layer including material for storing charge.

In another embodiment, an electrode is provided. The electrode includes a base including a current collector and a first joining layer disposed over the current collector; and a second joining layer joined to the first joining layer, the second joining layer including an carbonaceous layer disposed thereon, the carbonaceous layer including material for storing charge.

In another embodiment, a capacitor is provided. The capacitor includes a housing including at least one electrode including a base including a current collector and a first joining layer disposed over the current collector; and a second joining layer joined to the first joining layer, the second joining layer including a carbonaceous layer disposed thereon, the carbonaceous layer including material for storing charge of the capacitor; and at least one of an electrolyte and a dielectric material disposed therein, the at least one electrode coupled to an output electrode of the housing.

In another embodiment, a method for providing a multi-form electrode for an energy storage device is provided. The method includes selecting an electrode including an aggregate of carbon nanotubes in electrical contact with a current collector; disposing at least one nanoform carbon dispersed in a carrier material onto the aggregate; and expelling the carrier material to provide the multi-form electrode.

In another embodiment, a multi-form electrode for an energy storage device, the multi-form electrode is provided. The electrode includes an aggregate of carbon nanotubes disposed over a current collector, the aggregate further including at least one additional layer of nanoform carbon having been disposed over the aggregate as a solution including the nanoform carbon disbursed in a carrier material.

In another embodiment, an ultracapacitor is provided. The ultracapacitor includes a housing including at least multi-form electrode disposed therein; the multi-form electrode including an aggregate of carbon nanotubes disposed over a current collector, the aggregate further including at least one additional layer of nanoform carbon having been disposed over the aggregate as a solution including the nanoform carbon disbursed in a carrier material; and an electrolyte for providing ionic transport within the ultracapacitor.

In another embodiment, a method for providing a carbonaceous aggregate is provided. The method includes dispersing an aggregate of aligned carbon nanotubes into a first solution; dispersing a carbon addition into a second solution; ultrasonically mixing the first solution and the second solution; combining the mixed first solution and the mixed second solution to provide a combined solution; ultrasonically mixing the combined solution; obtaining a carbonaceous aggregate from the mixed combined solution.

In another embodiment, an electrode with energy storage media that includes a carbonaceous aggregate is provided. The electrode includes a current collector including the carbonaceous aggregate disposed thereon, the aggregate including a combination of sonicated carbon nanoforms.

In another embodiment, an ultracapacitor is provided. The ultracapacitor includes at least one electrode with energy storage media that includes a carbonaceous aggregate, the electrode including a current collector including the carbonaceous aggregate disposed thereon, the aggregate including a combination of sonicated carbon nanoforms.

In another embodiment, a method for fabricating an element of electrode is provided. The method includes selecting a substrate including an aggregate of carbon nanotubes disposed thereon; depositing a layer of conductive material onto the aggregate; and removing the aggregate and conductive material from the substrate.

In another embodiment, an electrode is provided. The electrode includes a plurality of electrode elements, each element including an aggregate of carbon nanotubes and a layer of conductive material disposed thereon; each of the elements coupled to another one of the elements, at least one coupling including a bond to the conductive material of the element.

In another embodiment, an ultracapacitor is provided. The ultracapacitor includes at least one electrode including a plurality of electrode elements, each element including an aggregate of carbon nanotubes and a layer of conductive material disposed thereon; each of the elements coupled to another one of the elements, at least one coupling including a bond to the conductive material of the element; a housing for containing the at least one electrode; and electrolyte for providing transport of ions within the ultracapacitor.

In another embodiment, a method for fabricating an electrode is provided. The method includes obtaining a layered stack of carbon nanotubes (CNT); wetting the layered stack with a solution; compressing the layered stack; drying the compressed layered stack; and applying a current collector to the compressed layered stack.

In another embodiment, an ultracapacitor is provided. The ultracapacitor includes: at least one electrode including a compressed layered stack of carbon nanotubes (CNT) and a current collector disposed onto the stack; and an electrolyte for transporting energy stored in the electrode to at least one terminal of the ultracapacitor.

In another embodiment, a method of using an ultracapacitor is provided. The method includes: obtaining an ultracapacitor comprising an electrolyte and two electrodes, each of the electrodes in electrical communication with a current collector and separated from the other by a separator; and cycling the ultracapacitor by alternatively charging and discharging the ultracapacitor, wherein a power density output of the ultracapacitor is at least 12 kW/kg up to about 250 kW/kg for each cycle.

In another embodiment, a method of using an ultracapacitor is provided. The method includes: obtaining an ultracapacitor comprising an electrolyte and two electrodes, each of the electrodes in electrical communication with a current collector and separated from the other by a separator; and cycling the ultracapacitor by alternatively charging and discharging the ultracapacitor, wherein an energy density output of the ultracapacitor is at least 1 Wh/kg up to about 35 Wh/kg for each cycle.

In another embodiment, a method of using an ultracapacitor is provided. The method includes: obtaining an ultracapacitor comprising an electrolyte and two electrodes, each of the electrodes in electrical communication with a current collector and separated from the other by a separator; and cycling the capacitor by alternatively charging and discharging the capacitor at least three times, while maintaining a voltage across the ultracapacitor between a maximum voltage and about half of the maximum voltage, wherein the charging and discharging provides an output from the ultracapacitor of at least 3.75 Wh/kg of energy in a single charge or discharge.

Additional embodiments will become apparent in light of the description provided below.

BRIEF DESCRIPTION OF THE DRAWINGS

The invention will be more fully understood by reference to the detailed description, in conjunction with the following figures, wherein:

FIG. 32B provides a blow-up of an initial part of the curve provided in FIG. 32A;

DETAILED DESCRIPTION OF THE INVENTION

Disclosed herein are methods and apparatus for providing carbon nanotubes (CNT). The carbon nanotubes (CNT) are particularly well suited for use in an ultracapacitor. When used in an ultracapacitor, the carbon nanotubes (CNT) disclosed herein provide for high power output and reliable operation. Prior to presenting aspects of the carbon nanotubes (CNT), some context is first provided.

Figure 1:
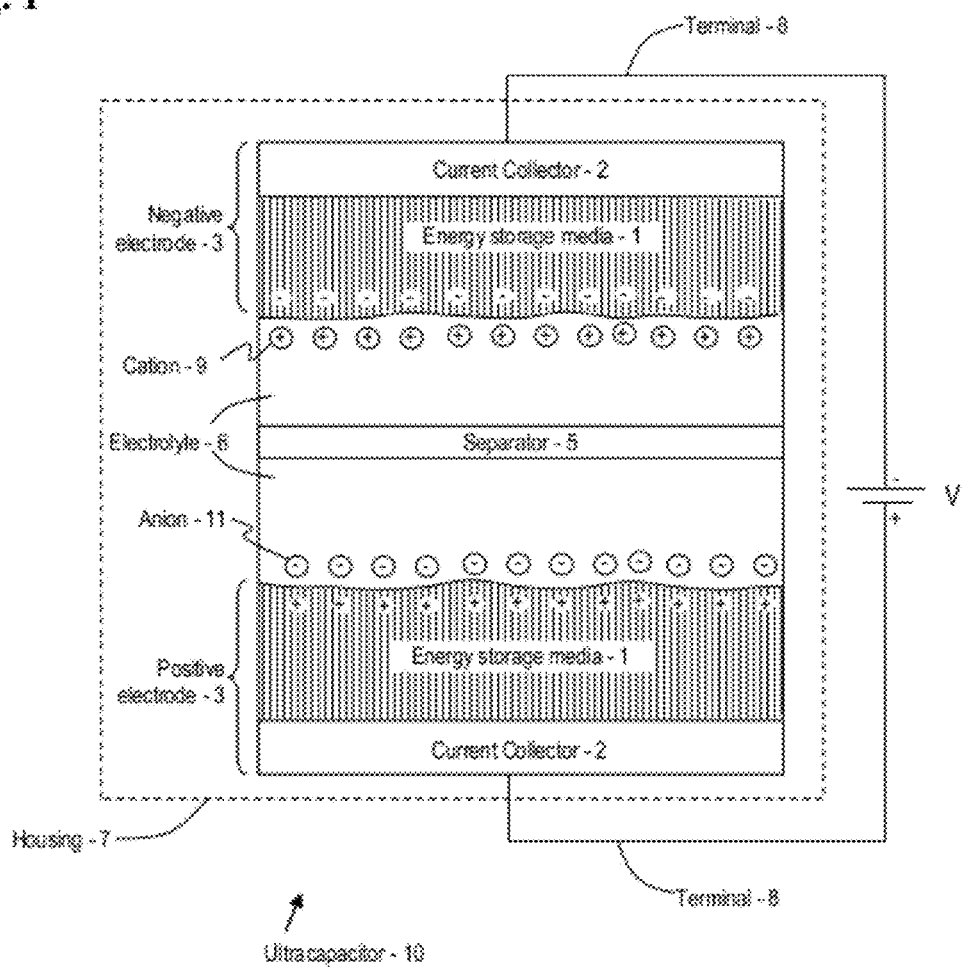
FIG. 1 is a schematic diagram of an ultracapacitor.

As shown in FIG. 1, an exemplary embodiment of an "ultracapacitor 10" is shown. In this case, the ultracapacitor 10 is an electric double-layer capacitor (EDLC). The EDLC includes at least one electrode 3 (in some cases, such as where there are two electrodes 3, the electrodes may be referred to as a negative electrode 3 and a positive electrode 3). When assembled into the ultracapacitor 10, each electrode 3 presents a double layer of charge at an electrolyte interface. In some embodiments, a plurality of electrodes 3 is included. However, for purposes of discussion, only two electrodes 3 are shown. As a matter of convention herein, at least one of the electrodes 3 uses a carbon-based energy storage media 1 (as discussed further herein) to provide energy storage.

Each of the electrodes 3 includes a respective current collector 2 (also referred to as a "charge collector"). The electrodes 3 are separated by a separator 5. In general, the separator 5 is a thin structural material (usually a sheet) used to separate the electrodes 3 into two or more compartments.

At least one form of electrolyte 6 is included, and fills void spaces in and between the electrodes 3 and the separator 5. In general, the electrolyte 6 is a substance that disassociates into electrically charged ions. A solvent that dissolves the substance may be included in some embodiments. A resulting electrolytic solution conducts electricity by ionic transport.

Generally, a combination of the electrode(s) 3 and the separator 5 are then formed into one of a wound form or prismatic form which is then packaged into a cylindrical or prismatic housing 7. Once the electrolyte 6 has been included, the housing 7 is hermetically sealed. In various examples, the package is hermetically sealed by techniques making use of laser, ultrasonic, and/or welding technologies. The housing 7 (also referred to as a "enclosing body" or "case" or by other similar terms) includes at least one terminal 8. Each terminal 8 provides electrical access to energy stored in the energy storage media 1, generally through electrical leads (not shown) which are coupled to the energy storage media 1.

That is, in some embodiments, a plurality of leads (not shown) are electrically coupled to each of the current collectors 2. Each plurality (accordingly to a polarity of the ultracapacitor 10) are grouped and coupled to respective terminals 8 of the housing 7.

In the exemplary EDLC, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers. The fabrication of carbon nanotubes and application of the nanotubes in the ultracapacitor 10 is discussed in detail further herein.

Accordingly, in some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

Some embodiments of various forms of carbonaceous material suited for use in energy storage media 1 are provided herein as examples. These embodiments, discussed below, provide robust energy storage and are well suited for use in the electrode 3. It should be noted that these examples are illustrative and are not limiting of embodiments of carbonaceous material suited for use in energy storage media 1.

The electrolyte 6 includes a pairing of cations 9 and anions 11 and may include a solvent. Various combinations of each may be used. In the exemplary EDLC, the cations 9 may include at least one of 1-(3-Cyanopropyl)-3-methylimidazolium, 1,2-Dimethyl-3-propylimidazolium, 1,3-Bis(3-cyanopropyl)imidazoliu, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof as well as other equivalents as deemed appropriate.

Additional exemplary cations 9 include imidazolium, pyrazinium, piperidinium, pyridinium, pyrimidinium, and pyrrolidinium. Generally, these cations 9 were selected as exhibiting high thermal stability, a low glass transition temperature (Tg), as well as high conductivity and exhibited good electric performance over a wide range of temperatures. Accordingly, other embodiments of cations 9 that exhibit desired properties may be used as well or in conjunction with any of the foregoing.

In the exemplary EDLC, the anions 11 may include at least one of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

The separator 5 may be fabricated from non-woven glass. The separator 5 may also be fabricated from fiberglass, ceramics and fluoro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

In general, the term "electrode" refers to an electrical conductor that is used to make contact to another material which is often non-metallic, in a device that may be incorporated into an electrical circuit. Exemplary second materials in an energy storage media may be of various forms including solid, liquid and gaseous. The materials of the energy storage media 1 may include conductive materials, semiconductors, electrolyte and the like. Generally, the term "electrode," as used herein, is with reference to the energy storage media 1 and the additional components as may accompany the energy storage media 1 to provide for desired functionality (for example, the current collector 2 which is mated to the energy storage media 1).

Referring now to FIGS. 2 through 5, aspects of methods and an apparatus for production of the carbon nanotubes (CNT) are shown. The techniques disclosed provide for a high degree of control over fabrication processes, and thus result in CNT that may be well adapted (i.e., designed for) specific applications, such as use in the ultracapacitor 10. As an overview, a base material is provided. A catalyst material is then disposed upon the base material, and a carbonaceous material is deposited onto the catalyst. As fabrication occurs in a substantially oxygen free environment, problems associated with oxidation and a need for reduction are avoided. When practicing the various aspects of the techniques, manufacturers of CNT will realize efficient processes for production of high quality CNT.

The techniques disclosed herein may be adjusted as necessary to provide CNT having desired properties. That is, the processes may be controlled with regard for favoring properties such as density, surface area, length, a number of walls, composition (i.e., metallic or non-metallic), end properties (i.e., open end or closed end) and the like.

Figure 2:
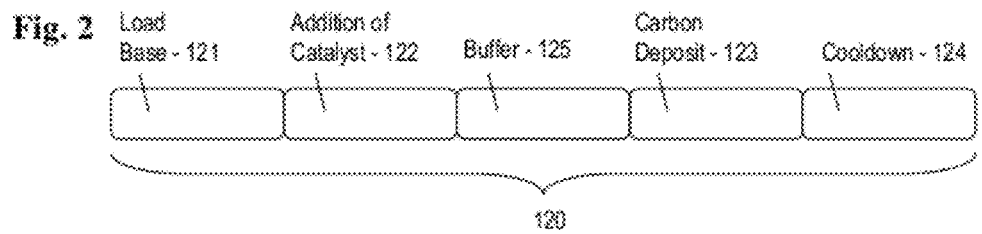
FIG. 2 is a block diagram schematically showing an embodiment of a functional configuration of a production apparatus.

Reference may be had to FIG. 2 for an overview of an exemplary embodiment. In FIG. 2, non-limiting aspects of a process for fabrication 120 of CNT are provided. In this embodiment, the process for fabrication 120 includes a first step where base material is loaded (base material loading 121) into a fabricator (also referred to as a "production apparatus" and by other similar terms). In a second step, a layer of a catalyst is applied to the base material (catalyst application 122). In a third step, carbonaceous material is progressively deposited onto the catalyst layer and the CNT are grown (carbon deposition 123, also referred to as a "deposition step," a "growth step" and by other similar terms). In a fourth step, the CNT are cooled for offloading and subsequent use (CNT cooldown 124). In some embodiments, a buffer step 125 is included as well, as is discussed further herein.

Aspects of an exemplary apparatus for mass production of the CNT are provided. In various embodiments, the apparatus is arranged to provide rigorous environmental controls (e.g., control over temperature, atmospheric content and/or pressure, etc, . . . ). In some embodiments, the CNT product is produced in an ongoing (i.e., uninterrupted or continuous) process. By controlling the production environment throughout the process, and by varying aspects of the production environment as needed during the process, it is possible to produce CNT that exhibit desired properties.

As one might imagine, the process requires considerable equipment and controls and therefore that the description of these four steps is an oversimplification. In order to provide some context for greater explanation of each step in the process for fabrication 120, as well as additional embodiments, some definitions, parameters, properties and such are now presented.

A machine that is referred to as a "production apparatus," "fabricator" or by any other similar term or terms herein generally includes components as necessary or desired for fabrication of the CNT. Exemplary components that are included in the production apparatus include components as necessary to perform described functions. Exemplary and non-limiting examples of components that may be included include at least one pump, valve, electrical conduit, gas conduit, power supply, gas supply (including supplies of inert gas, carbonaceous gas and the like), water supply, nozzle, intake, outlet, vent, exhaust, fan, material moving apparatus (such as a conveyer belt, drive system and the like), heating element (such as a resistive heating element), heat exchanger (or other form of refrigeration), shutter, door, servo, motor, sensor (electrical, temperature, pressure, gas, optical, etc, . . . ), transducer, controller, human interface, computer interface, processor, data storage, memory, bus, computer executable code for governing operation of the machine, and others as may be needed by a machine operator, manufacturer or designer. In short, the various technologies that support and enable the processes described herein are considered to be well known, and generally not a part of the invention disclosed herein. Accordingly, given the many embodiments and variations of equipment for implementing the teachings herein, discussion of such equipment is generally limited to some of the aspects that may affect generation of the CNT aggregate.

As used herein "aligned CNT aggregate," "CNT aggregate," "vertically aligned carbon nanotubes, VCNT," and other similar terms generally refer to a structure in which a large number of CNTs are aligned or oriented in a common manner. In some embodiments, specific surface area, SA, of the aligned CNT aggregate is not less than 300 m$^2$/g (e.g., when the CNTs are mostly unopened). In other embodiments, the surface area, SA, is not less than 1,300 m$^2$/g (such as when the CNTs are mostly opened). "Aggregates of CNT" generally refer to a plurality of vertically aligned CNT structures. In some embodiments, the weight density ($\rho_w$) ranges from 0.002 g/cm$^3$ to 0.2 g/cm$^3$. In general, embodiments of CNTS discussed herein are with relation to vertically aligned carbon nanotubes, VCNT. However, in some embodiments, such as where CNT are mixed with other nanoforms of carbon, this is not a requirement, or even the case.

It should be recognized that the term "vertically aligned" with reference to nanotubes and other nanostructures is generally with reference to orientation of the nanotubes at the time of fabrication. However, this terminology is not meant to be limiting. That is, when considering an aggregate of "vertically aligned nanotubes," it is recognized that the term vertical may become inconsequential or misleading. Accordingly, as discussed herein, it should be recognized that aggregates and other forms of "vertically aligned nanotubes" generally refer to aggregates that include substantially parallel, repetitive or organized structures.

In order for the CNT aggregate to exhibit common orientation and a large specific surface area, SA, the height of the CNT aggregate may be in a range of not less than 10 μm to not greater than 1 cm. Generally, a height of not less than 10 μm leads to an improvement in orientation. Alternatively, a height of not greater than 1 cm makes it possible to improve the specific surface area, SA, because such a height makes rapid generation possible and the adhesion of carbonaceous impurities is therefore controlled.

In various embodiments, the carbon nanotubes generally exhibit certain characteristics. Among other things, the carbon nanotubes produced, in some embodiments, exhibit a length of between about 50 μm to about 5 mm (or longer). In some of these embodiments, the carbon nanotubes are between about 200 μm to about 2 mm. In some embodiments, the carbon nanotubes may include, for example, between 1 and 10 walls. In some embodiments, the carbon nanotubes include, for example, between 1 and 5 walls. The carbon nanotubes may have a diameter of about, for example, between 0.7 nm and 10 nm. When considered as an array of vertically aligned carbon nanotubes, a density may be between about 10$^3$ CNT/cm$^2$ to about 10$^{13}$ CNT/cm$^2$. In some embodiments, a density may be between about 10$^{11}$ CNT/cm$^2$ to about 10$^{12}$ CNT/cm$^2$.

Carbon nanotubes used in the electrode 3 may be treated or otherwise processed such that certain properties are realized. Exemplary properties or physical characteristics of the carbon nanotubes when included in the electrode include a thickness of active material that is between about 30 μm and 500 μm, in some cases between about 100 μm and about 200 μm; a volumetric density of between about 0.3 g/cm$^3$ and about 0.8 g/cm$^3$, in some cases between about 0.5 g/cm$^3$ and about 0.6 g/cm$^3$. Generally, the carbon nanotubes do not include any type of binder. The energy storage media may include vertically aligned carbon nanotubes, entangled carbon nanotubes, other forms of carbon, and any combination of materials deemed appropriate. Generally, the carbon nanotubes exhibit a surface area, SA, of between about 500 m$^2$/g and about 2,200 m$^2$/g (which may be an increase of surface area over untreated CNT as a result of formation of holes and/or pores on the CNT walls). When formed as energy storage media, the carbon nanotubes may have a compression ratio (if vertically aligned) that is about 10:1 to about 100:1.

Accordingly, when used in the ultracapacitor 10, the electrode 3 that makes use of the carbon nanotubes described herein may also exhibit certain advantageous properties. For example, performance of the ultracapacitor 10 may include gravimetric specific capacitance of between about 100 F/g and about 200 F/g (at maximum operating voltage); a volumetric specific capacitance of between about 50 F/cc and about 100 F/cc (at maximum operating voltage); a maximum operating voltage of between about 3 V and 4.5 V. For example, the ultracapacitor 10 may exhibit an equivalent series resistance (ESR) of between about 0.5 Ohm/cm$^2$ and about 1 Ohm/cm$^2$.

The term "base material" generally refers to a member that is capable of supporting a catalyst for carbon nanotubes on a surface thereof, and can maintain its shape even at a high temperature (for example, a temperature that is not lower than 400 degrees Celsius). Any type of base material that has been proven to be usable for production of CNTs may be used. Non-limiting examples of materials include: metals such as iron, nickel, chromium, molybdenum, tungsten, titanium, aluminum, manganese, cobalt, copper, silver, gold, platinum, niobium, tantalum, lead, zinc, gallium, germanium, arsenic, indium, phosphor, and antimony; alloys and oxides containing these or other suitable materials; nonmetals such as silicon, quartz, glass, mica, graphite, and diamond; and ceramic. Generally, the metal materials are lower in cost than silicon and ceramic. In particular, a Fe—Cr (iron-chromium) alloy, a Fe—Ni (iron-nickel) alloy, a Fe—Cr—Ni (iron-chromium-nickel) alloy, and the like are suitable. The base material may take the form of a thin film, a block, or a powder, as well as a flat plate. However, in particular, such a form that the base material has a large surface area for its volume is advantageous to mass production.

The term "carburizing prevention layer" generally refers to a layer on the base material. The base material may have a carburizing prevention layer formed on either a front or back surface thereof. In some embodiments, the base material includes a carburizing prevention layer formed on each of the front and back surfaces thereof. The forming may be realized through techniques such as, for example, sputtering. Generally, the carburizing prevention layer is a protecting layer for preventing the base material from being carburized and therefore deformed in the step of generating carbon nanotubes. The carburizing prevention layer may vary in thickness. In various embodiments, the thickness of the carburizing prevention layer is between about 1 nm to about 500 nm, and in some cases between about 5 nm to about 100 nm.

In some embodiments, the carburizing prevention layer is composed of a metal or ceramic material (the ceramic material being effective in preventing carburizing). Examples of suitable metal include copper and aluminum. Examples of suitable ceramic material include: oxides such as aluminum oxide, silicon oxide, zirconium oxide, magnesium oxide, titanium oxide, silica alumina, chromium oxide, boron oxide, calcium oxide, and zinc oxide; and nitrides such as aluminum nitride and silicon nitride. It is noted that aluminum oxide and silicon oxide are both very effective in preventing carburizing.

As used herein, a "catalyst" may be provided on the base material or the carburizing prevention layer. Any type of catalyst that has been proven to be usable for production of CNTs can be used. Non-limiting examples of the catalyst include iron, nickel, cobalt, molybdenum, a chloride thereof, an alloy thereof, and a complex or layer thereof with aluminum, alumina, titania, titanium nitride, or silicon oxide. Other non-limiting examples include an iron-molybdenum thin film, an alumina-iron thin film, an alumina-cobalt thin film, an alumina-iron-molybdenum thin film, an aluminum-iron thin film, and an aluminum-iron-molybdenum thin film. The catalyst can be used in a range of quantities that has been proven to be usable for production of CNTs. For example, in some embodiments making use of iron, a thickness of a film formed may be in a range of not less than 0.1 nm to not greater than 100 nm. In some other embodiments, the thickness of the iron may be not less than 0.5 nm to not greater than 5 nm. In some further embodiments, the thickness of the iron may be 0.8 nm to not greater than 2 nm.

The catalyst may include a plurality of layers. The catalyst may be continuous or at least partially non-continuous over a layer of base material, or another layer, such as the carburizing prevention layer. In some embodiments, another layer, such as an additional carburizing prevention layer may be disposed over the catalyst. In some embodiments, the catalyst may include metal deposited over another material, such as an oxide. The deposition results in "clusters," or a non-continuous layer. As used herein, the term "continuous" generally refers to "wetting" or a substantially complete coverage of an underlying material.

It is possible to apply a dry process to the formation of the catalyst onto the surface of the base material. For example, a sputtering evaporation method may be used. Other techniques such as any one or more of cathodic arc deposition, sputter deposition, ion beam assisted deposition, ion beam induced deposition and electrospray ionization may be used as appropriate. Further, it is possible to form the catalyst into any shape with concomitant use of patterning obtained by applying well-known photolithography, nanoprinting or the like.

In one embodiment, it is possible to arbitrarily control the shape of an aligned CNT aggregate. This may be achieved, for example, according to patterning of the catalyst formed on the substrate and controlling the growth time for CNTs. As a result, the aligned CNT aggregate takes a thin-film shape, a cylindrical shape, a prismatic shape, or any other complicated shape. In particular, in the shape of a thin film, the aligned CNT aggregate has an extremely small thickness (height) as compared with its length and width; however, the length and width can be arbitrarily controlled according to the catalyst patterning, and the thickness can be arbitrarily controlled according to the growth time for CNTs that constitute the aligned CNT aggregate. In some embodiments, the catalyst morphology is adapted, for example, by changing or controlling particle sizes in the catalyst, thus providing for adjustments in diameter of CNTs grown on the catalyst.

In general, a "reducing gas" is not required by the teachings herein. A reducing gas is commonly used in the prior art to provide for reducing the catalyst. The reducing gas may include any material that is in a gaseous state at a growth temperature. The reducing gas may also be used for stimulating the catalyst to become fine particles suitable for the growth of CNTs as well as to improve the activity of the catalyst. An example of the reducing gas is a gas having reducing ability, such as hydrogen gas, ammonium, water vapor, or a mixture thereof. While the reducing gas is generally used to overcome oxidation, the processes disclosed herein are substantially oxidation free.

A "raw material gas" is generally used to supply raw (i.e., carbonaceous) material for generation of the CNTs. Any type of raw material that has been proven to be usable for production of CNTs can be used. In general, raw-material carbon sources that are gaseous at the growth temperature can be used. Among them, hydrocarbons such as methane, ethane, ethylene, propane, butane, pentane, hexane, heptanepropylene, and acetylene are suitable. In addition, lower alcohols such as methanol and ethanol, acetone, low-carbon oxygen-containing compounds such as carbon monoxide, and mixtures thereof can be used. Further, the raw material gas may be diluted with an inert gas.

Generally, "inert gas" is a gas that may be included in the production processes, and only needs to be a gas that is inert at the temperature at which CNTs grow. Generally, "inert" is considered to be a property of the gas where it does not react substantially with growing of the CNTs. Any type of inert gas that has been proven to be usable for production of CNTs can be used. Non-limiting examples of inert gas are helium, argon, hydrogen, nitrogen, neon, krypton, carbon dioxide, chlorine and mixtures thereof.

A "catalyst activation material" may be used in various embodiments. The addition of the catalyst activation material makes it possible to improve efficiency in the production of carbon nanotubes and the purity of the carbon nanotubes. In general, the catalyst activation material may be characterized as an oxygen-containing substance that does not significantly damage CNTs at the growth temperature. Accordingly, in some respects, this environment may be considered a "substantially oxygen-free environment." Effective examples other than water include: low-carbon oxygen-containing compounds such as hydrogen sulfide, oxygen, ozone, acidic gases, nitrogen oxide, carbon monoxide, and carbon dioxide; alcohols such as ethanol and methanol; ethers such as tetrahydrofuran; ketones such as acetone; aldehydes; esters; nitrogen oxide; and mixtures of thereof.

In general, the catalyst activation material only needs to be added in small amounts, however, there are no particular limits on amounts to be added. As an example, in some embodiments, when the catalyst activation material is water, the catalyst activation material is added in a range of about 10 ppm to about no more than 10,000 ppm, in some of these embodiments in amounts not less than 50 ppm to not greater than 1,000 ppm, and in some of these embodiments in amounts not less than 100 ppm to not greater than 700 ppm.

With the addition of the catalyst activation material, the activity of the catalyst is enhanced and the longevity of the catalyst is extended. When the catalyst activation material is added the growth of CNTs continues for a longer period of time and the growth rate increases as well. As a result, a CNT aggregate with a marked increase in height is obtained.

An "environment of high-carbon concentration" refers to a growth atmosphere in which a proportion of the raw material gas to the total flow is approximately 2% to about 20%. This generally refers to an environment where excess carbon is present, which results in inefficient growth of the CNTs. That is, for example, an environment of high-carbon concentration may induce deactivation of the catalyst.

Since the activity of the catalyst is improved by the catalyst activation material, the activity of the catalyst will continue even in some environments of high-carbon concentration. Thus, the growth rate of the CNT may be remarkably improved.

With regard to furnace pressure, in various embodiments, the furnace pressure is not lower than $10^2$ Pa and not higher than $10^7$ Pa (100 in atmospheric pressure). In some embodiments, the furnace pressure is not lower than $10^4$ Pa and not higher than $3 \times 10^5$ Pa (3 in atmospheric pressure).

The reaction temperature at which the CNTs are synthesized may be determined with consideration of various parameters, such as properties of the metal catalyst, the raw-material carbon source and the furnace pressure. In embodiments making use of catalyst activation material, the reaction temperature is generally set for a temperature range such that the catalyst activation material will operate adequately.

Specifically, in the case of use of water as the catalyst activation material, it is preferable that the reaction temperature be in a range of 400 degrees Celsius to 1,000 degrees Celsius. At 400 degrees Celsius or lower, the catalyst activation material does not express its effect. At 1,000 degrees Celsius or higher, the catalyst activation material may react with the CNTs.

Alternatively, in the case of use of carbon dioxide as the catalyst activation material, it is preferable that the reaction temperature be in a range of about 400 degrees Celsius to about 1,100 degrees Celsius. Generally, at a temperature of 400 degrees Celsius or lower, the catalyst activation material does not express its effect. At 1,100 degrees Celsius or higher, the catalyst activation material reacts with the CNTs.

As used herein, the terms "growth step," "deposition step," and other similar terms refer to a process for synthesizing a CNT aggregate. Generally, this step involves providing an environment surrounding the catalyst that includes a carbonaceous component, such as the raw material gas, and heating at least one of the environment, the raw material gas and the catalyst. This results in the CNT aggregate.

As used herein, a "cooling step" (also referred to as "CNT cooldown 124" and by other similar terms) generally refers to a step of cooling down the CNT aggregate, the catalyst, and the base material. In some embodiments, the cooling step is performed in the presence of an inert gas. That is, after the growth step, the CNT aggregate, the catalyst, and the base material are high in temperature, and as such, will be oxidized when placed in the presence of oxygen. Oxidation is substantially prevented by cooling down the CNT aggregate, the catalyst, and the base material to a temperature where oxidation processes are substantially limited. In some examples, cessation of cool down is at or below a temperature of about 200 degrees Celsius.

A "load section" generally includes a set of devices for preventing the outside air from flowing into the production apparatus. That is, in operation, the load section provides components for loading the base material. Generally, the base material is loaded onto a conveyance device. Once loaded, oxygen is expelled from the load section (by at least one of a negative pressure exhaust and a pressurizing with inert gas). In some embodiments, the load section is isolated by at least one of a gas curtain, a door, a shutter or other such device.

Once environmental control has been established in the load section (i.e., once the load section is substantially or adequately oxygen-free), the base material is advanced to a catalyst application section for completion of the catalyst application 122. Like the load section, the catalyst application section of the production apparatus is subject to environmental control (i.e., is substantially or adequately oxygen-free). Once the base material is oriented in the catalyst application section, the catalyst is applied to the base material. One embodiment for applying the catalyst includes sputtering the catalyst onto the base material.

As used herein, the term "substantially oxygen-free" is with reference to an environment where oxygen does not perturb intended functionality. For example, in a substantially oxygen-free environment load section, the base material will experience only negligible amounts of oxidation.

Once an adequate layer of catalyst has been applied to the base material (which may include the carburizing prevention layer disposed thereon), a CNT substrate is realized. The substrate may be characterized as a base material having a layer of catalyst material disposed thereon. Advantageously, as the substrate has been produced in a substantially or adequately oxygen-free environment, the catalyst is not subject to any significant oxidation. Thus, the substrate is prepared for growth of the CNT.

Once the substrate has been prepared, in some embodiments, it is moved into a buffer section for completion of the buffer step 125. In various embodiments, the buffer section provides for at least one of adjusting and changing at least one of pressure, temperature and gas in the environment surrounding the substrate. The buffer section may also provide other functionality, such as loading or reorienting the substrate.

The substrate may then be transferred to a carbon deposition section for completion of the carbon deposition 123. The deposition section has a function of synthesizing the CNT aggregate by causing the environment surrounding the catalyst, to be an environment of a raw material gas and by heating at least one of the catalyst and the raw material gas. Specific examples of the deposition section include a furnace in which the environment of the raw material gas is retained, a raw material gas injection section for injecting the raw material gas, and a heater for heating at least one of the catalyst and the raw material gas. The heater may be any type of heater that is capable of heating adequately. In some embodiments, the heater heats to a temperature in a range of between about 400 degrees Celsius and about 1,100 degrees Celsius. Non-limiting examples of the heater include a resistance heater, an infrared heater, and an electromagnetic induction heater.

In some embodiments, the deposition section also includes a sub-section for addition of the catalyst activation material. Generally, the sub-section to add the catalyst activation material is equipped to provide the activation material directly into the raw material gas, or to add the catalyst activation material directly to the environment surrounding the catalyst inside of the deposition section. The catalyst activation material may be supplied in a variety of ways, including by supplying the catalyst activation material through a bubbler, supplying the catalyst activation material by vaporizing a solution containing the catalyst activation material, supplying the catalyst activation material as it is in a gaseous state, and supplying the catalyst activation material by liquefying or vaporizing a solid catalyst activation material. The sub-section may include a supply system using various apparatuses such as at least one of a vaporizer, a mixer, a stirrer, a diluter, a pump, and a compressor. Some embodiments include a device for measuring a concentration of the catalyst activation material in the sub-section. Through feedback and engineering controls, a stable supply of the catalyst activation material can be ensured.

Following growth of the CNT, and while the CNT aggregate remains in a temperature range that is at or about the temperature range used for fabrication, oxidation of the CNT aggregate remains a concern. Accordingly, the CNT aggregate is transferred from the deposition section to a cooling section.

The cooling section provides for cooling down CNT aggregate and the substrate on which the CNT aggregate has grown. The cooling section has a function of exerting antioxidant and cooling effects on the CNT aggregate, the catalyst, and the base material after deposition has been completed. Exemplary apparatus for the cooling section include a receiving area for receiving the substrate and CNT aggregate, the receiving area disposed within a volume in which an inert gas is retained. The volume may include, for example, inlets (and outlets) for providing a flow of lower temperature inert gas, at least one cooling conduit disposed in the volume, the cooling conduit for carrying a liquid coolant (such as water) as well as any other similar apparatus suited for conveying a cooling media. Additional apparatus may be included external to the cooling section, such additional apparatus including, for example, at least one heat exchanger that is capable of dissipating heat carried from the cooling unit.

Having thus introduced various components of the production apparatus, certain additional aspects are now discussed.

The fabrication techniques disclosed herein generally do not require the use of a reducing gas. That is, the fabrication techniques result in catalyst materials that are prepared substantially free of oxidation. Accordingly, operation of the production apparatus is generally performed in a manner that limits intrusion of oxygen (such as in the form of ambient air) into the production area. Thus, the various steps discussed herein may be performed in the presence of at least an inert gas (which is provided, among other things, to displace any oxygen).

Thus, the production apparatus may be configured to ensure a relatively oxygen free environment. That is, various engineering controls (many of which are introduced above), may be arranged to ensure maintenance of a desired environment. As in the case of FIG. 2, discussion of FIG. 3 is in a functional format.

Figure 3:
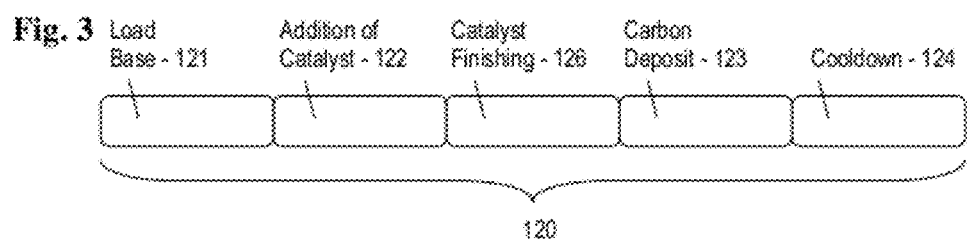
FIG. 3 is a block diagram schematically showing another embodiment of a functional configuration of a production apparatus.

Referring now to FIG. 3, there are shown aspects of an additional embodiment of a production apparatus. In this embodiment, an intermediate step is included. That is, after the catalyst is disposed onto the base material (catalyst application 122), and before carbon deposition 123, another step is performed. In some embodiments of the another step, a plasma is provided. More specifically, the substrate (i.e., the base material with the catalyst disposed thereon) is subjected to catalyst finishing 126, by, for example a plasma treatment. As with application of the catalyst, the catalyst finishing 126 is performed without a need for creating a reducing environment, such as by addition of a reducing gas. By controlling the time and power of the plasma, morphology of the catalyst may be adjusted. Specifically, in this step, the plasma may be controlled to result in desired changes to the catalyst. Exemplary changes include modifications to particle size as well as density of particles in the catalyst. Following catalyst finishing 126 where surface treatment of the catalyst is performed, the substrate proceeds into the carbon deposition 123. Although not depicted in FIG. 3, some embodiments may also include at least one buffer section to provide for the buffer step 125.

In general, in the embodiments shown in FIGS. 2 and 3, the process begins and ends with human interaction (for example, loading base material, unloading finished product). However, in other embodiments, additional automated steps or functions may take place.

Figure 4:
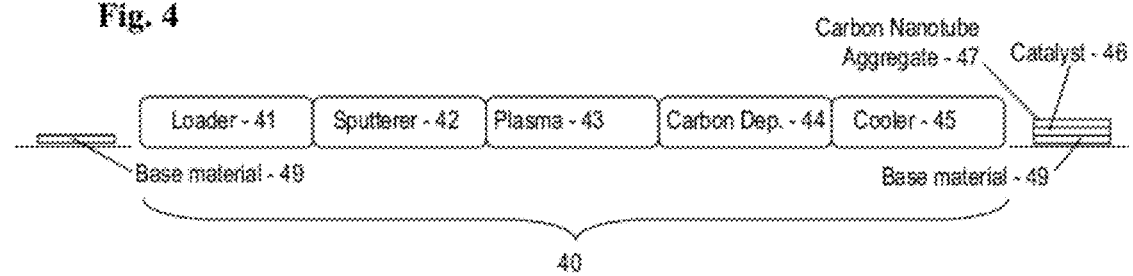
FIG. 4 is a block diagram of aspects of the production apparatus.

FIG. 4 depicts aspects of an embodiment of a production apparatus 40. In this example, the production apparatus 40 includes a loader section 41, a sputterer section 42, a plasma section 43, a carbon deposition section 44 and a cooler section 45. During operation, the base material 49 is loaded into the production apparatus via the loader section 41. The base material 49 progresses through the sputterer section 42, the plasma section 43, the carbon deposition section 44 and the cooler section 45 on a conveyor-belt to emerge as a finished product. That is, the base material 49 emerges from the production apparatus 40 with a catalyst layer 46 disposed thereon and carbon nanotube aggregate 47 disposed on the catalyst layer 46. In some of these embodiments, the conveyor-belt (not shown) is actually a plurality of conveyor belts, thus permitting fine control over the speed the base material 49 is conveyed through each section of the production apparatus 40.

Each of the foregoing sections of the production apparatus 40 may make use of any particular type of equipment that is deemed appropriate, and is only limited by practical considerations such as ability to operate at elevated temperatures. For example, a "gas shower" may be used in the carbon deposition section 44 to provide for uniform dispersion of the carbonaceous material.

In general, the term "gas shower" refers to a volume into which at least one gaseous material is introduced, such as by gas injection. Generally, the gas shower provides for fulfillment of goals such as, for example, isolation of a first volume in the production apparatus 40 from a second volume in the production apparatus 40 and the like. The gas shower may include a "drain" (i.e., an exhaust). The drain may be at a negative pressure, and adapted for substantially pulling out the at least one gaseous material from the volume of the gas shower. A gas shower may make use of known components to achieve the intended design and/or functionality determined by at least one of a designer, manufacturer and user.

The carbon nanotube aggregate 47 may be harvested in a variety of ways (some of which are presented herein). Following the harvesting, in some embodiments, an etching or other process may be used to remove the catalyst layer 46 from the base material 49. The base material 49 may then be suitably prepared and recycled into production.

Figure 5:
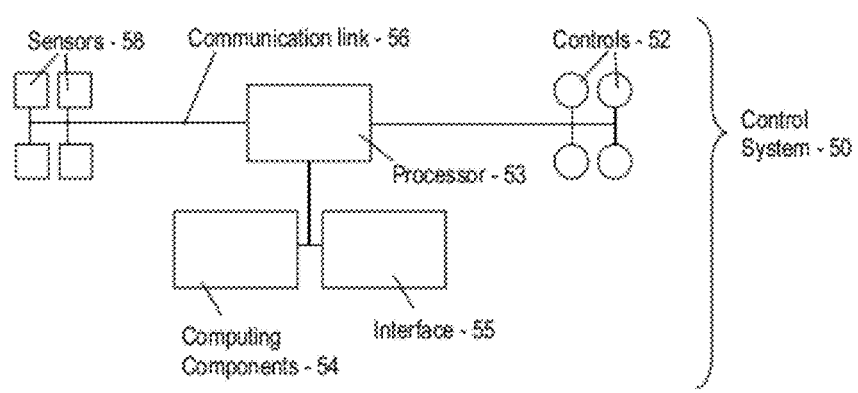
FIG. 5 is a block diagram depicting aspects of a control system for the production apparatus.

Referring now to FIG. 5, aspects of an exemplary control system 50 for the production apparatus are shown. In this example, the control system 50 includes a plurality of sensors 58. The sensors 58 may include apparatus for measuring temperature, gas, feed rate, optical properties and the like. In short, any process dynamic that is useful for controlling the production process. The sensors 58 communicate with at least one processor 53 through a communications link 56. Any type of communications link 56 may be used, including wired and wireless links. The at least one processor 53 in turn communicates with computing components 54 (such as memory, data storage, a power supply, a clock, machine executable program instructions stored on machine readable media in the form of software, and other such components) as well as at least one interface 55. The at least one interface 55 may include a keyboard, a video display, a mouse, a network adapter, a printer and other similar interface components. These components of the control system 50 provide input to controls 52 (such as a servo, a motor, a valve, a heater, a gas supply, an operator and any other type of process control) to modify the production process.

The control system 50 may be used for governing production apparatus 40 such as those of embodiments described herein, as well as other production apparatus. For example, the control system 50 may be used with systems that include a formation unit and a separate growth unit as well as a transfer mechanism. In short, the control system 50 is customizable and may be used to control virtually any system designed for fabrication of carbon nanotube aggregate. Aspects that may be controlled by the control system 50 include, without limitation, temperature, flow rate, conveyor speed, processes related to layering (such as layer thickness, control over combinations of materials (such as gases, etc, . . . )) and the like.

As practicable, the control system 50 provides for in-line (i.e., real-time) quality control. By way of example, the control system 50 may include an optical metrology system that measures at least one property of at least one of the catalyst layer 46 and the carbon nanotube aggregate 47. Exemplary properties include thickness, density, surface appearance, etc, . . . . When included in the production apparatus 40, the optical metrology system may provide information to a user or other similar output, so as to ensure adequate layering of materials, early rejection of defective materials, and the like.

Examples of materials for components of the production apparatus 40 include materials capable of resisting high temperatures, such as quartz, heat-resistant ceramic, heat-resistance alloys. However, the heat-resistance alloys are preferable in terms of precision of processing, degree of freedom of processing, and cost. Examples of the heat-resistance alloys include heat-resistant steel, stainless steel, and nickel-based alloys. In general, the terms "heat-resistant steel" refers to steel that contains Fe in major proportions and other alloys in concentrations of not greater than 50 percent, and "stainless steel" refers to steel that contains approximately not less than 12 percent of Cr. Further, examples of the nickel-based alloys include alloys obtained by adding Mo, Cr, Fe, and the like to Ni. Specifically, SUS 310, Inconel 600, Inconel 601, Inconel 625, Incoloy 800, MC Alloy, Haynes 230 Alloy may be useful in consideration of heat resistance, mechanical strength, chemical stability, and low cost.

The presence of carbon contaminants that adhere to the wall surfaces and other components of the production apparatus 40 when CNTs are synthesized can be reduced by various techniques. That is, by way of example, interior facing components such as the inner walls of the furnaces and/or the components for use in the furnaces may be fabricated from a metal (e.g., a heat-resistant alloy and finished by treatment of surfaces thereof, such as the interior facing surfaces). This provides for, among other things, continued production output while limiting deterioration in quality of the resulting aligned CNT aggregates.

As a matter of convention, and for clarity, components of the production apparatus that may be finished by a treatment process, referred to as "passivation." The components of the production apparatus that may be finished by passivation are referred to generally as an "item." For purposes of discussion, an "item" is considered to include, without limitation, components that may have at least one surface, the surface of the item may be at least one of smooth, rough, irregular and discontinuous. The item may have an interior surface and an exterior or outside surface. Passivation of each item may also impart improved resistance to, or prevention of, hydrogen permeation by application of a coating on the inside of the item which is subjected to a vacuum. Passivation may also impart improved resistance to, or prevention of, hydrogen permeation by application of a coating on the outside of the item where the inside of the item is subjected to a vacuum. Alternately, for example, passivation may be provided on an inner surface and an outer surface of the item. Passivation may be useful for imparting improved properties on the surface of an item. In addition, passivation can play an important role in limiting penetration of carbonaceous materials (such as carbonaceous materials resulting from decomposition of the raw material gas) into components of the production apparatus 40, thus limiting degradation of the production apparatus 40 and thereby extending a lifetime of the production apparatus 40.

Limiting build-up of surface contaminants may be achieved by passivation of items incorporated into the production apparatus. One non-limiting example includes use of a method for passivating the surface of a particular item to protect at least one surface of the item against corrosion, surface effects in a vacuum environment, or both. In general, each item to be passivated is placed in a treatment environment and is first dehydrated and then the environment is evacuated. A silicon hydride gas is introduced into the treatment environment, which may be heated prior to the introduction of the gas. The item and silicon hydride gas contained therein are heated, if the treatment environment was not already heated prior to the introduction of the gas and pressurized to decompose the gas. A layer of silicon is deposited on the surface of the item. The duration of the silicon depositing step is controlled to prevent the formation of silicon dust in the treatment environment. The item is then cooled and held at a cooled temperature to prepare surface conditions for subsequent depositions, and the treatment environment is purged with an inert gas to remove the silicon hydride gas.

The item is cycled through the silicon depositing step until the surface of the item is covered with a layer of silicon. The treatment environment is then evacuated and the item cooled to room temperature.

In another example, passivating of a surface of an item is performed to protect a surface of the item against corrosion, the undesirable effects on a vacuum environment, or both. A chemical deposition process is implemented through which the item is coated with silicon to impart properties for application in corrosive and/or vacuum environments. The use of single to multiple deposition layers with intermediate changes in process temperature, pressures and time has been found to impart coatings that provide enhanced properties to the item being treated that include, but are not limited to, application in corrosive environments for improved resistivity, and application in vacuum environments to reduce off-gassing, out-gassing, and hydrogen permeation of items. The item may have enhanced properties for vacuum environments, such as, for example, low ($10^5$ to $3.3 \times 10^3$ Pa), medium ($3.3 \times 10^3$ to $10^{-1}$ Pa), high ($10^{-1}$ to $10^{-4}$ Pa), very high ($10^{-4}$ to $10^{-7}$ Pa), ultrahigh ($10^{-7}$ to $10^{-10}$ Pa), and extreme ultrahigh vacuum (less than $10^{-10}$ Pa).

A surface which may be coated can include an interior surface, as well as, or alternately, any other surface of the item. Items having contact surfaces which have been passivated in accordance with these techniques will generally exhibit properties for improved resistance to corrosion and reduce the release of gas molecules subjected to a vacuum environment.

In another example, the item is placed in an environment, such as, for example, a treatment chamber, which may be controlled to carry out the steps for passivation. Passivation may be carried out using the item itself or with the item housed in a treatment chamber. In some embodiments, the surface of a respective item is initially preconditioned by dehydrating the surface of the item. In the dehydration step, the item is heated to a temperature in a range of from about 20 degrees Celsius to 600 degrees Celsius for a duration of from about 10 to 240 minutes. The item may be heated in an inert gas or in a vacuum.

In this example, after the surfaces of the item have been dehydrated, the environment surrounding the surface of the item or treatment chamber is evacuated. A silicon hydride gas may be introduced into the environment surrounding the item or treatment chamber. The item and gas are heated and pressurized to decompose the silicon hydride gas in the treatment chamber. Heating of the silicon hydride gas may be done prior to, during or after the introduction of the gas into the treatment chamber. The treatment chamber may be heated and then followed by the introduction of the silicon hydride gas. As the gas decomposes, a layer of silicon is deposited on the surface of the item.

The duration of the silicon deposition step and the pressure of the gas is controlled to prevent the formation of silicon dust on the item or in the treatment chamber. At the end of the silicon deposition, the environment or treatment chamber is cooled and held at a temperature for a period of time, and is purged with an inert gas to remove the silicon hydride gas. The purging may take place prior to, after or while the item is cooling. In some embodiments, the purging is done as the item is being cooled. If the silicon layer completely covers the surface of the item, the item is then removed and cooled to room temperature. If the silicon layer does not completely cover the surface of the item, the silicon deposition step may be repeated until the surface is completely covered and thereby passivated.

In some embodiments, the silicon hydride gas is selected from the group comprising $SiH_4$ and $Si_nH_{n+2}$. The silicon hydride gas may be heated to a temperature approximately equal to a decomposition temperature of the gas, such as to a temperature in a range of from about 300 degrees Celsius to about 600 degrees Celsius. In some embodiments, the silicon hydride gas may be pressurized to a pressure in a range of from about $1 \times 10^{-7}$ torr to 2500 torr, and particularly in a range of from about 100 torr to 250 torr.

The techniques also provide for a corrosion resistant substrate or component having a passivated surface. For example, the substrate may comprise metal (ferrous and non-ferrous), glass, carbon, copper, quartz, nickel-containing ferrous alloys, titanium, aluminum and ceramics. As a matter of convention, the surface of the substrate has an average surface roughness, RA. A silicon layer is formed over the substrate surface to passivate the surface. The silicon layer may be formed from a plurality of layers of silicon and is substantially free of silicon dust. In some embodiments, from one to ten layers of silicon may be applied.

It should be appreciated that the techniques for passivation may by used to passivate the surface of a component or particular item, and in particular, items which exhibit undesirable traits when exposed to vacuum conditions, corrosive substances, carbon rich gasses, or would otherwise benefit from passivation. For example, the techniques may by used to passivate the surfaces of substrates which are comprised of metal (ferrous and non-ferrous), glass, carbon, copper, quartz, nickel-containing ferrous alloys, titanium, aluminum and ceramics. The passivation of a surface which will be exposed to corrosive substance or molecules, such as, for example, organo-sulfurs, hydrogen sulfide, alcohols, acetates, metal hydrides, hydrochloric acid, nitric acid, or sulfuric acid and aqueous salts, serves to protect the surface against corrosion. The passivation of a surface also provides benefits to the substrate in vacuum environments to reduce undesirable effects, including off-gassing and out-gassing, hydrogen permeation, and, in particular, collection or aggregation of contaminants on the respective surface.

Techniques for passivation are now provided in greater detail.

Initially, the surface to be passivated is preconditioned. Successive layers of silicon are then applied to the surface under controlled conditions where the surface is cooled and maintained at a temperature for a period of time between successive deposition layers. In some embodiments, silicon deposition layers are applied until the silicon layer covers the entire surface area of the item. The method may be carried out on or within the item itself, or by placing the item in a controlled environment, such as, for example, a treatment chamber.

Each surface for passivation is initially preconditioned by removing any water adsorbed thereon. In the dehydration step, the vessel is heated to a temperature in the range of from about 20 degrees Celsius to about 600 degrees Celsius for a time period of a duration from about 10 minutes to 240 minutes (4 hours). During the dehydration step, the treatment chamber containing the substrate to be passivated is either evacuated or filled with an inert gas (noble gases or nitrogen). At the end of the dehydration process, the treatment chamber is evacuated to remove the vaporized water.

After the treatment chamber is dehydrated and evacuated, silicon hydride gas, such as $SiH_4$ or $Si_nH_{n+2}$, is introduced onto the surface or into the treatment chamber containing the item. In some embodiments, the pressure of the silicon hydride gas is within a range of between about $1 \times 10^{-7}$ torr to 2500 torr, and a particularly range of from about 100 torr to 250 ton. The item as well as gas contained in the treatment chamber, is heated to a temperature approximately equal to the gas decomposition temperature if it is not already at that temperature as a result of the dehydration step. In some embodiments, the item and gas are heated to a temperature in the range of from about 300 degrees Celsius to about 600 degrees Celsius. The silicon hydride gas may be introduced under heat, or introduced at room temperature and subsequently heated. At these pressures and temperatures, the silicon hydride gas decomposes into silicon and hydrogen gas at or near the surface. The silicon formed during the decomposition process attaches to the surface of the item being treated.

Generally, the duration of the silicon deposition process is controlled. Under the above-described conditions, the decomposition of silicon hydride gas in the treatment chamber may eventually also form an undesirable by-product referred to herein as silicon dust as a result of pressure, time and temperature. Silicon dust is the result of the silicon hydride gas reacting with itself to form silicon and hydrogen gas. This gas phase nucleation forms silicon dust which will settle to the surface of the item or treatment chamber by gravity and may compromise the integrity of the silicon layer being formed on the surface. The silicon dust may also create a physical barrier between successive layers of silicon in the passive layer.

The formation of silicon dust may be affected by the duration of the deposition process, the pressure of the gas, and the presence of contaminants on the surface of the substrate, or a combination of any or all of them. In order to facilitate prevention of the formation of silicon dust, the duration of the silicon deposition process is controlled and limited to a period in a range from about 1 minute up to about 480 minutes (8 hours). The silicon deposition process may be abbreviated as one way to prevent the formation of silicon dust. However, the layer of silicon may not completely cover the entire surface after one silicon deposition cycle. Therefore, the silicon deposition cycle may be repeated several times to build up the passive layer of silicon to a desired thickness. However, efficacy of passivation may benefit from a single deposition layer. In some embodiments, efficacy may be improved by the deposition of one layer to ten layers of silicon on the surface, independent of the surface roughness, RA. In some cases, it may be particularly desirable to improve performance by having six silicon layers deposited on the surface.

After the first silicon deposition cycle, the treatment chamber containing the item may be purged with an inert gas to remove the silicon hydride gas. If the layer of silicon does not completely cover the surface of the item, the silicon deposition cycle may be repeated. Prior to deposition of a subsequent silicon layer, the surface of the item is cooled and permitted to remain at a lower temperature to establish the surface properties in preparation for subsequent silicon layer deposition. In some embodiments, the surface is cooled to a range of about 50 degrees Celsius to about 400 degrees Celsius, and permitted to remain at the cooled temperature for about 5 minutes to about 100 minutes.

As one example, a rough or smooth (electropolished or polished) surface with surface roughness, RA, of less than about 20 microinches may derive the benefits of passivation as described herein with a single deposition cycle. The number of layers chosen for increased efficacy of the passivation may be selected independent of surface roughness, RA. The number of layers for improved resistance to corrosion may be selected independent of surface roughness, RA.

After the passive layer of silicon is formed, the treatment chamber containing the item is cooled to a range of about 50 degrees Celsius to about 400 degrees Celsius, and held for a duration of from about 5 minutes to about 100 minutes, and is purged with an inert gas to remove the reactive silicon hydride gas. This inert gas purge ensures that the decomposition reaction of the silicon hydride is stopped to reduce unwanted gas phase nucleation problems which occur due to reaction of the silicon hydride components with themselves as opposed to the surface of the item or the treatment chamber. After the final purging step, the treatment chamber containing the item may be evacuated and cooled to room temperature.

In some embodiments, the passive silicon layer deposited on the surface may be about 100 angstroms thick to 50,000 angstroms thick.

The foregoing techniques for passivation have particular use for passivating items which will be included within the production apparatus 40, and which may be subject the item to at least one of a corrosive element and a gaseous environment (such as an environment of the raw material gas). More specifically, techniques for passivation presented herein result in treatment of surfaces of items with a resulting effect that buildup of carbonaceous materials and forms of carbon on the surfaces is substantially limited. This effectively results in a production apparatus 40 that incorporates at least one design element for ensuring manufacturing hygiene.

Passivation may be used, among other things, to impart resistive properties to a respective surface to minimize undesirable effects of a corrosive substance such as, for example, chemisorption of other molecules; reversible and irreversible physiosorption of other molecules, catalytic activity with other molecules; allowing of attack from foreign species, resulting in a molecular, structural and/or cosmetic breakdown of the surfaces and/or bulk; or any of the aforementioned combinations. In addition, the techniques presented are particularly useful for passivating items which may be used in vacuum or low pressure environments. The techniques for passivation may present a variety of other benefits as well, such as imparting chemical resistivity, limiting effects of materials gassing, simplifying cleaning and the like.

The method may be used to impart chemically resistive properties to a substrate to minimize undesirable surface effects in a vacuum environment on a substrate such as for example off-gassing or out-gassing of volatile materials (e.g. water vapor and organics) from a substrate under vacuum environments resulting in extensive time required to reach a target vacuum and/or the inability to achieve a target vacuum and/or the inability to maintain a target vacuum; hydrogen permeation of a substrate under vacuum environments through coating on the inside and/or outside whereas the inner portion is subjected to vacuum; or any of the aforementioned combinations.

Although the method may be carried out using a treatment chamber configured to house a respective item during the process steps, it will be understood that the item itself, depending on its configuration, may serve as its own treatment chamber where the method may be carried out within the item. For example, the passivation process may be, in some embodiments, carried out in an oven, resulting in treatment (i.e., passivation) of surfaces within the oven.

In short, components of the furnace(s) may be passivated or otherwise treated as appropriate in advance of production. In the examples provided, it may be considered that the term "passivated" generally refers to any method of treatment suited to limiting buildup of contamination (i.e., tramp carbon, or carbonaceous residue) during fabrication processes, and attendant reduction of partial pressure of the raw material gas. While the methods introduced include silicon, and silicon containing material, the term "passivation material" may be considered to encompass these materials and any other embodiments of materials that are suited to limiting the buildup of carbonaceous residue.

The components may be periodically evaluated for ability to limit buildup of contaminants. As appropriate, a user may renew components or replace components to ensure continued performance.

Having thus described techniques for fabrication of an aggregate that exhibits superior properties, additional techniques for use of the aggregate and other forms of carbonaceous material (alone or in conjunction with the aggregate) are now presented. Generally, these additional techniques are directed to providing a superior electrode 3 for use in the ultracapacitor 10, although the electrode 3 may be incorporated into other energy storage devices as appropriate.

Advantageously, the electrode 3 may be fabricated from mass-produced CNT 47 and exhibits, among other things, higher gravimetric power density (power as a function of weight) and volumetric power density (power as a function of volume) than previously achievable. Further, the high-power electrode 3 exhibits a low internal resistance and can be configured to provide high voltages (such as, of about four or more volts).

In some embodiments of the exemplary methods and apparatus for providing a high-power electrode, the electrode 3 includes at least one layer of carbon based energy storage media 1, and may include an additional one to many layers.

Figure 6:
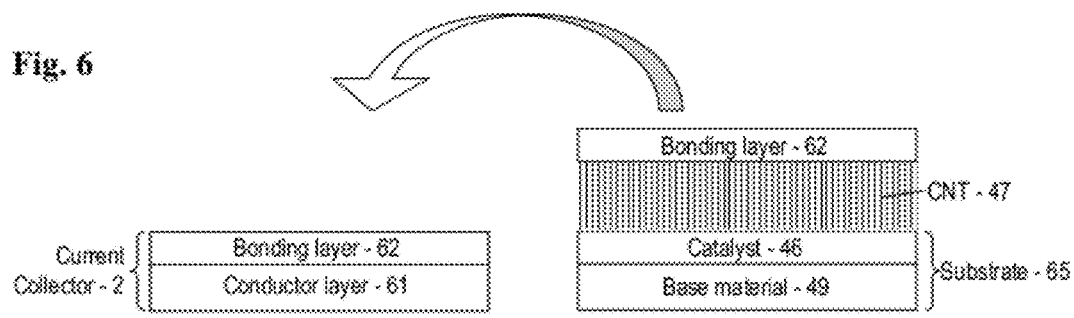
FIG. 6 is a block diagram depicting a current collector and a substrate onto which a plurality of carbon nanotubes (CNT) have been formed.

Various exemplary embodiments of techniques for fabrication of carbonaceous material and electrodes made from the carbonaceous material are now provided. The exemplary embodiments include a high-power electrode that is fabricated from at least one layer of compressed carbon nanotubes; a functionally layered electrode; a multi-form electrode; an electrode fabricated from formed carbonaceous aggregate; an electrode that is fabricated from a plurality of electrode elements; and a densified electrode. The exemplary embodiments provide a plurality of embodiments of techniques for manipulating carbonaceous materials for use in the energy storage media 1. The examples should not be considered as limiting. For example, aspects of one embodiment may be used at least in part, with another one of the various embodiments. Additional techniques will become apparent with review of various embodiments In one embodiment of the electrode 3, at least one layer of compressed carbon nanotubes is used as the energy storage media. Refer now to FIGS. 6 through 10 for an introduction to aspects of this embodiment of the electrode 3. In this example, the electrode 3 provided may include a plurality of layers of compressed carbon nanotubes and/or other forms of carbon. Refer to FIG. 6, where assembly of the electrode 3 begins with the current collector 2 and a deposition of carbonaceous material. In the embodiments discussed with reference to FIGS. 6 through 10, the carbonaceous material is an aggregate of CNT 47. However, the embodiments discussed with reference to FIGS. 6 through 10 are not limited to use of CNT 47 and the carbonaceous material may assume other forms, such as some of the forms presented elsewhere herein.

In FIG. 6, an embodiment of the current collector 2 is shown. Generally, the current collector 2 includes a conductor layer 61, and may include a bonding layer 62. The conductor layer 61 may be fabricated from any material suited for conducting charge in the intended application. An exemplary material includes aluminum. The conductor layer 61 may be presented as a foil, a mesh, a plurality of wires or in other forms. Generally, the conductor layer 61 is selected for properties such as conductivity and being electrically inert. In some embodiments, the conductor layer 61 is prepared by removing an oxide layer thereon. The oxide may be removed by, for example, etching the conductor layer 61 with KOH.

In some embodiments, the bonding layer 62 is disposed on the conductor layer 61. The bonding layer 62 may appear as a thin layer, such as layer that is applied by sputtering, e-beam or through another suitable technique. In various embodiments, the bonding layer 62 is between about 10 nm to about 500 nm in thickness. Generally, the bonding layer 62 is selected for its properties such as conductivity, being electrically inert and compatibility with the material of the conductor layer 61. Some exemplary materials include aluminum, gold, silver, palladium, tin and platinum as well as alloys or in combinations of materials, such as Fe—Cr—Ni.

A second component includes a substrate 65 that is host to the carbon nanotube aggregate (CNT) 47. In the embodiment shown in FIG. 6, the substrate 65 includes a base material 49 with a thin layer of the catalyst 46 disposed thereon. In general, the substrate 65 is at least somewhat flexible (i.e., the substrate 65 is not brittle), and is fabricated from components that can withstand environments for deposition of the CNT 47 (e.g., a high-temperature environment of between about 400 degrees Celsius to about 1,100 degrees Celsius).

Once the CNT 47 have been fabricated, another bonding layer 62 is disposed thereon. In some embodiments, the another bonding layer 62 is between about 10 nm to about 500 nm thick. Subsequently, the bonding layer 62 of the current collector 2 is mated with another bonding layer 62 disposed over the CNT 47, as shown in FIG. 7.

Figure 7:
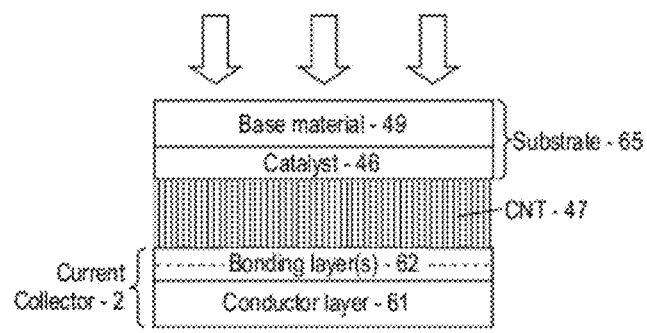
FIG. 7 is a block diagram depicting loading the CNT of FIG. 6 onto the current collector.

FIG. 7 illustrates aspects of mating the CNT 47 with the current collector 2. As implied by the downward arrows, pressure is applied onto the base material 49. The application of the CNT 47 may be accompanied by heating of the components. As an example, when platinum is used in the bonding layer 62, heating to between about 200 degrees Celsius to about 250 degrees Celsius is generally adequate. Subsequently, the CNT 47 and the catalyst 46 are separated, with a resulting layer of CNT 47 disposed onto the current collector 2.

Various post-manufacture processes may be completed to encourage separation of the CNT 47 from the catalyst 46. For example, following completion of deposition, the substrate 65 including the CNT 47 thereon may be exposed to (e.g., heated in) an environment of room air, carbon dioxide or another appropriate environment. Generally, the post-manufacture treatment of the CNT 47 includes slowly ramping the CNT 47 to an elevated temperature, and then maintaining the CNT 47 at temperature for a few hours at a reduced pressure (i.e., below about one atmosphere).

Figure 8:
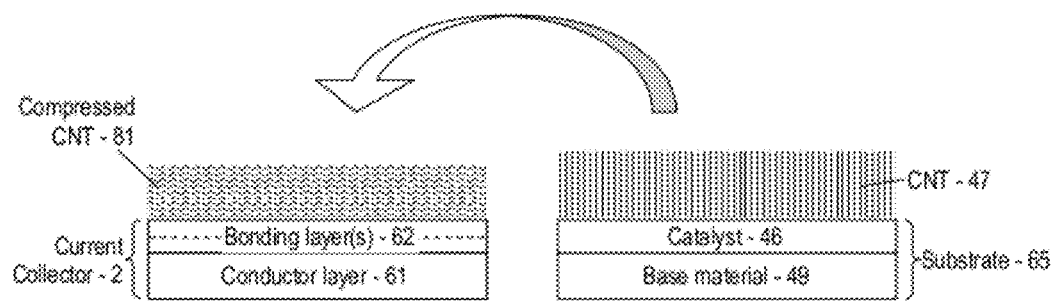
FIG. 8 is a block diagram depicting the loaded current collector of FIG. 7, as well as another substrate prepared for transfer of additional CNT onto the loaded current collector.

As shown in FIG. 8, the process of transferring the CNT 47 onto the current collector 2 with the addition of pressure results in a layer of compressed CNT 81. The compressed CNT 81, which may now include physical defects, such as windows and cracks, generally provide more surface area for charge storage, while occupying a smaller volume than the uncompressed CNT 47. Also shown in FIG. 8, is the addition of another layer of CNT 47.

Figure 9:
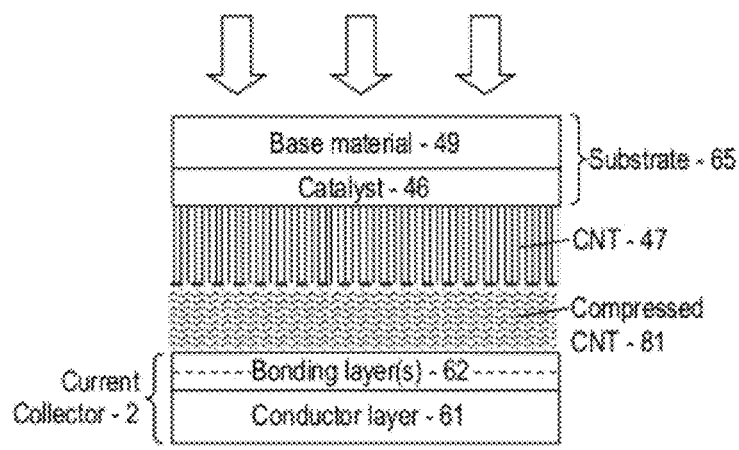
FIG. 9 is a block diagram depicting loading of additional CNT onto the loaded current collector.
Figure 10:
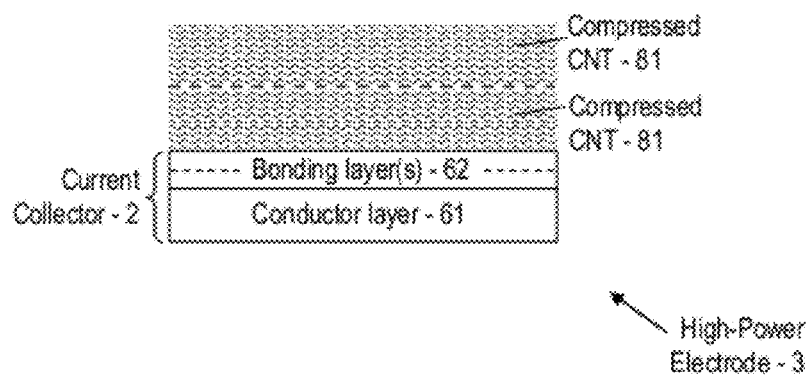
FIG. 10 is a block diagram depicting a high-power electrode resulting from multiple transfers of CNT onto the current collector of FIG. 6.

As shown in FIG. 9, the another layer of CNT 47 may be applied over the compressed CNT 81. In some embodiments, this process involves applying a nominal amount of pressure (such as by hand). Generally, it is considered that the another layer of CNT 47 is transferred to (i.e., adheres to) the compressed CNT 81 by the Van der Waals forces between the carbon nanotubes. Advantageously, this results in another layer of compressed CNT 81 (i.e., another thickness of compressed CNT 81) on the current collector 2, as shown in FIG. 10. A high-power and high-energy electrode 3 is realized by applying a plurality of layers of compressed CNT 81.

The process may be repeated to provide a plurality of thicknesses of compressed CNT 81 on the current collector 2. In general, however, it is expected that certain practical limitations will be realized. That is, for example, compounding defects in transfer of each layer may result in a layer of compressed CNT 81 that does not exhibit desired performance for charge storage. However, it is also expected that as transfer protocols continue to improve, that the addition of an ever greater number of layers will be possible.

Accordingly, the current collector 2 with at least one layer of compressed CNT 81 to a plurality of layers of compressed CNT 81 disposed thereon may be used as a charge storage device (i.e., an embodiment of the electrode 3). Generally, such embodiments of the electrode 3 are particularly well adapted for use in the ultracapacitor 10. In addition to some of the foregoing mentioned advantages (higher gravimetric and volumetric power densities, low internal resistance and high voltage delivery as well as higher energy density), less electrolyte 6 is required. Thus, users are provided with an improved performance energy storage that is less expensive to manufacture than some similar embodiments of energy storage.

Figure 11A:
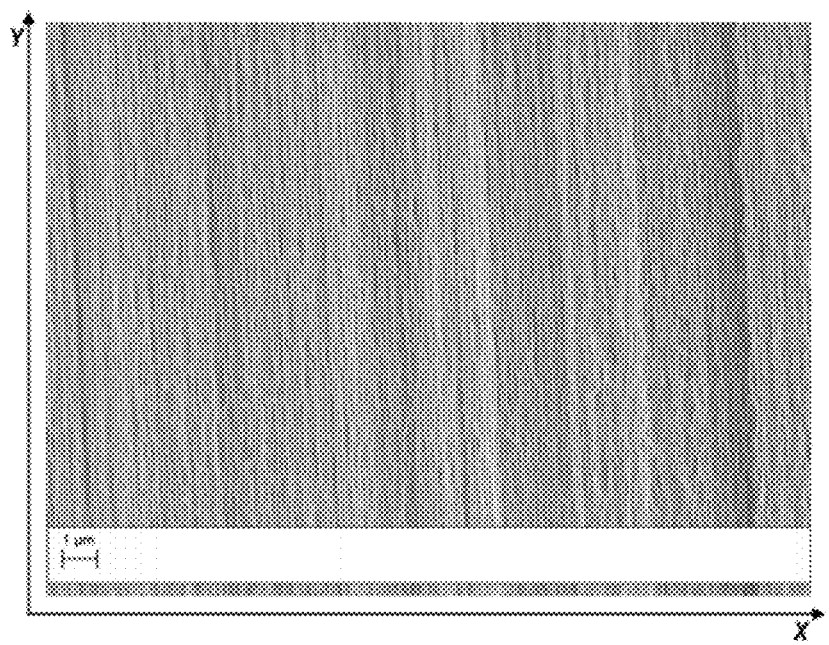
FIGS. 11A and 11B, collectively referred to herein as FIG. 11, depict a transmission electron microscopic photograph of uncompressed and compressed carbon nanotubes, respectively.
Figure 11B:
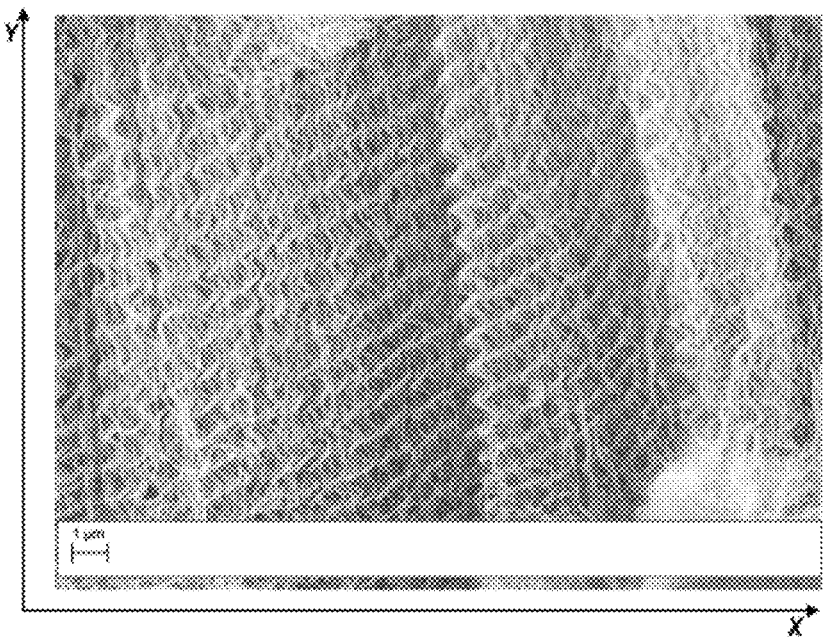

A comparative example of CNT 47 and compressed CNT 81 is provided in FIG. 11. That is, FIGS. 11A and 11B, collectively referred to herein as FIG. 11, depict a transmission electron microscopic photograph of uncompressed CNT 47 and compressed CNT 81, respectively.

As shown in FIG. 11A, the CNT 47 are relatively straight and parallel along a Y-direction. As shown in FIG. 11B, the compressed CNT 81 exhibit a periodic deformation (such as a "wave"). That is, while the compressed CNT 81 generally remain parallel to each other, the compressed CNT 81 are not straight (in comparison to uncompressed CNT 47). That is, in some embodiments, a shape of the compressed CNT 81 may be described by a function, such as a sinusoidal function. In other embodiments, a periodicity of the wave form may otherwise described or quantified. In some further embodiments, the compressed CNT 81 do not exhibit a repetitive form (or deformation). In short, the compressed CNT 81 may be a result of compression of CNT 47 (uncompressed CNT) such that a particular property of the CNT 47 is improved or enhanced. The enhancement may be a result of any one or more of particular phenomena, such as an increase in density, an increase in defects or the like.

As a demonstration of the advantages of the carbon nanotubes of the teachings herein, a comparative evaluation was performed. In this evaluation, two ultracapacitors 10 were constructed. A first one of the ultracapacitors 10 included electrodes 3 that were made of activated carbon. A second one of the ultracapacitors 10 included a carbon nanotube based electrode 3 according to the teachings herein. The results are depicted in FIG. 12. Otherwise, the ultracapacitors 10 were identical in every respect.

Figure 12A:
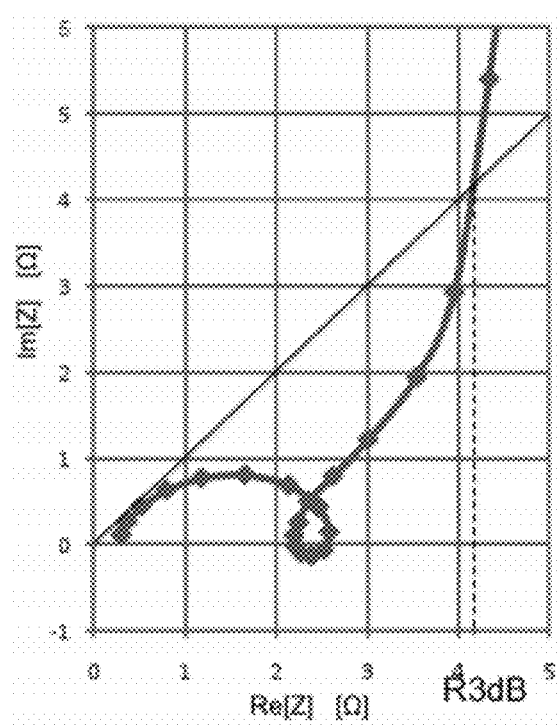
FIGS. 12A and 12B, collectively referred to herein as FIG. 12, depict comparative performance of an ultracapacitor that is based on activated carbon, and carbon nanotubes, respectively.
Figure 12B:
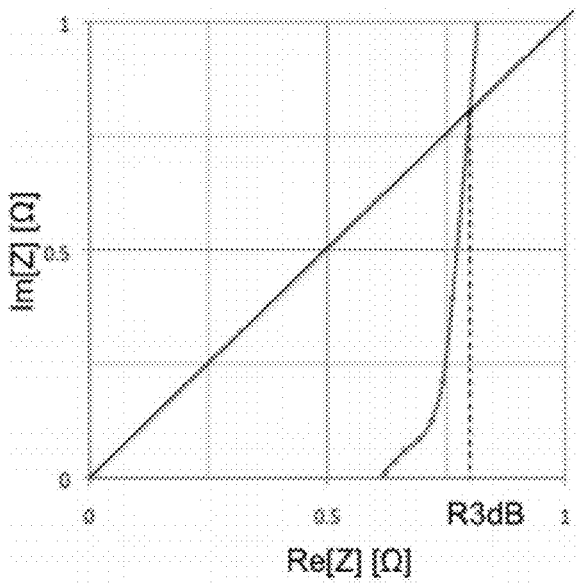

In FIGS. 12A and 12B, collectively referred to herein as FIG. 12, Nyquist plots showing comparative performance are provided. FIG. 12A depicts a (prior art) capacitor using activated carbon electrodes, while FIG. 12B depicts an ultracapacitor 10 that makes use of carbon nanotube based electrodes. A conservative estimation of the electrode resistance is the resistance at the 3 dB point in the Nyquist plot. FIG. 12A shows that full cell resistance for the prior art capacitor is about 4 Ohm/cm$^2$, while FIG. 12B shows that full cell resistance for the carbon nanotube based capacitor is about 1 Ohm/cm$^2$. Further, it may be seen that a electrode contact resistance of the activated carbon embodiment (FIG. 12A) is substantial (as exhibited by the semi-circle in the Nyquist plot), while virtually non-existent in the CNT embodiment (FIG. 12B).

In some embodiments, consideration may be given to the particular properties of the base material 49, the catalyst 46, the conductor layer 61 and the bonding layer 62. That is, for example, if the foregoing fabrication is completed in a substantially oxygen-free environment, it is expected that other materials and processes may be used (or omitted) to provide for the current collector 2 with at least one layer of compressed CNT 81 to a plurality of layers of compressed CNT 81. Accordingly, these and other embodiments as may be devised by one skilled in the art are within the ambit of the invention and the teachings herein.

Consider now an additional embodiment of the electrode 3, which is generally referred to as a "functionally layered electrode."

Figure 13A:
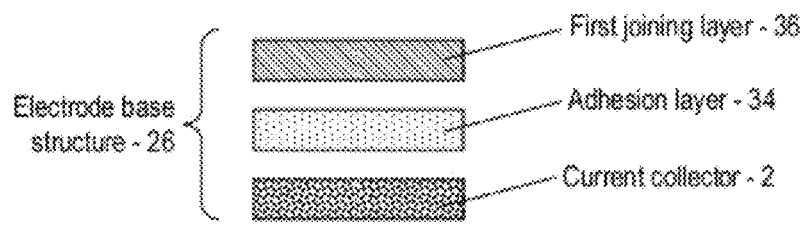
FIGS. 13A and 13B, collectively referred to as FIG. 13, are block diagrams depicting aspects of embodiments of an electrode base structure and an electrode process structure.
Figure 13B:
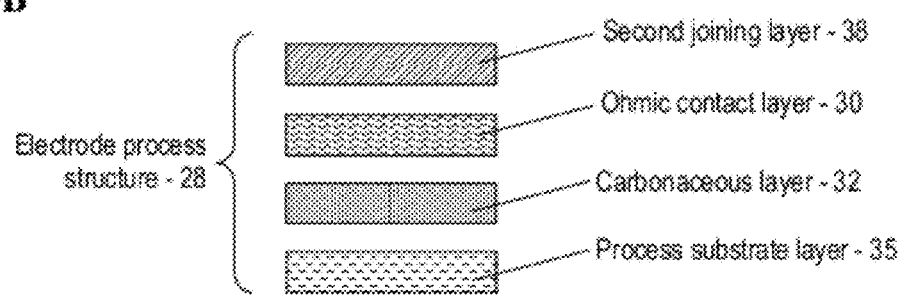

Turning now to FIG. 13, aspects of exemplary embodiments of the functionally layered electrode 3 are shown. Generally, the functionally layered electrode 3 may be fabricated from two separate structures (i.e., an electrode base structure 26 and an electrode process structure 28). In the example shown in FIG. 13A, the electrode base structure 26 (which may provide a structure upon which the fabricated electrode will reside), may include an embodiment of the current collector 2, fabricated from, for example, aluminum (Al) foil or copper (Cu) foil. The exemplary electrode process structure 28 shown in FIG. 13B includes a process substrate layer 35 (that includes, for example, tungsten (W) or stainless steel (SS) or aluminum (Al) foil) and a carbonaceous layer 32 that is formed of carbonaceous material as may be used in the energy storage media 1. Generally, the electrode process structure 28 provides a structure onto which carbonaceous material is produced.

One goal is to produce the carbonaceous layer 32 on the process substrate layer 35, but effectively transfer the carbonaceous layer 32 so it is coupled, such as through intermediate materials, to the current collector 2. The materials making up the process substrate layer 35 and the current collector 2 may be different. The materials may be chosen in consideration of aspects such as carbon material production process requirements and effectiveness of the current collector 2. Decoupling the design constraints among the process substrate layer 35 and the current collector 2 material choices has notable advantages in performance, cost, reliability, and so forth.

In some embodiments, the electrode base structure 26 may include three layers. For example, the current collector 2 may be provided as a first layer of the three layers. Because the current collector 2 ultimately carries a working current from capacitor terminals to the carbonaceous material, materials used should be chosen for good conductivity. Because the current collector 2 will be exposed to an electrolyte in which the electrode will ultimately be immersed, material for the current collector 2 should be chosen for good electrochemical compliance, usually a suitably low reaction rate with a given electrolyte. For practical reasons, such as ease of thermal bonding under mechanical compression, and so forth, the material in the current collector 2 and thickness of the material should be chosen for mechanical flexibility. Examples of materials that may be included in the current collector 2 are aluminum (Al), stainless steel, nickel (Ni), copper (Cu), iron (Fe), tantalum (Ta), conductive oxides (for example, indium-tin-oxide (ITO)), or a combination of those materials. In general, a thickness of the current collector 2 may vary between about 1 micrometer (μm) and 100 μm.

The current collector 2, if desired, may be first immersed in a base etchant, such as potassium hydroxide (KOH, which may be useful for embodiments of the electrode that include aluminum), and/or back sputtered to remove an oxide film, for example, aluminum oxide ($Al_2O_3$). If the processes for producing the electrode base structure 26 are performed in a low-oxygen environment, such as would be required for magnetron sputtering, then the removal of any oxide layer by etching, back sputtering or otherwise, may be performed in the same chamber. The second and third layers, if deposited in the same chamber, then form a protective barrier useful for preventing further oxidation once the electrode base structure 26 is removed from the low oxygen environment.

A second layer, referred to as the "adhesion layer 34," may be used to improve adhesion between the current collector 2 and the third layer, which is referred to as a "first joining layer 36." The adhesion layer 34 may be deposited onto the current collector 2 using magnetron sputtering or a similar process. Typical materials included in the adhesion layer 34 are titanium (Ti), chromium (Cr), titanium-tungsten (Ti—W) or a combination of those materials. If the conductivity of the material making up the adhesion layer 34 is relatively low, then its thickness should be limited to achieve suitable current handling performance. In general, a thickness of this adhesion layer 34 varies between about 1 nanometer (nm) and about 100 (nm).

The first joining layer 36 is useful for joining the electrode base structure 26 to the electrode process structure 28. If the electrode base structure 26 and the electrode process structure 28 are to be thermally bonded using moderate temperature and mechanical pressure, then a soft metal may be most useful for the first joining layer 36. The first joining layer 36 may be deposited onto the adhesion layer 34 using magnetron sputtering or a similar process. If the conductivity of the material of the first joining layer 36 is relatively low, then a thickness of the first joining layer 36 should be limited to achieve suitable current handling performance. Exemplary materials used for the first joining layer 36 include platinum (Pt), gold (Au), silver (Ag), palladium (Pd), tin (Sn), nickel (Ni), copper (Cu) or a combination of those materials. In general, a thickness of this first joining layer 36 varies between about 1 nm and about 10 µm.

In some embodiments, the electrode process structure 28 includes four layers. A first layer of the electrode process structure 28 is a process substrate layer 35 upon which active electrode material may be produced. An exemplary process substrate layer 35 is a substructure that includes a tungsten (W) foil, iron (Fe) (particles), and an aluminum (Al) interlayer. The thicknesses of the layers in this exemplary process substrate layer 35 may vary in the ranges of about 5 µm to 1 mm, 0.5 nm to 5 nm, and 2 nm to 100 nm for the three sub-layers, respectively. This exemplary process substrate layer is useful for producing a particular carbon electrode material including vertically aligned carbon nanotubes (VACNTs) by chemical vapor deposition methods. For practical reasons, such as ease of thermal bonding under mechanical compression, and so forth, the process substrate material and thickness should be chosen for mechanical flexibility. Other typical process substrate materials include stainless steel, nickel (Ni), or a combination of those materials.

A carbonaceous layer 32 of the electrode process structure 28 includes material that is ultimately responsible for storing charge in the produced capacitor. Exemplary materials suited for use in the carbonaceous layer 32 include activated carbon, carbon fibers, rayon, graphene, aerogel, carbon cloth, carbon nanohorns, carbon nanotubes (CNTs) and a combination of those materials. Other carbonaceous materials as disclosed herein may be used in the carbonaceous layer 32. Material used in the carbonaceous layer 32 may be produced through chemical vapor deposition (CVD), deposited or pressed onto the process substrate layer 35 among other methods. In general, a thickness of the carbonaceous layer 32 may vary in the range from about 1 µm to about 10 mm.

An ohmic contact layer 30 may be included in the electrode process structure 28 and is useful for achieving an ohmic contact with the carbonaceous layer 32. If the ohmic contact layer 30 will be exposed, through a porous carbonaceous layer 32 to the electrolyte in which the electrode will ultimately be immersed, the ohmic contact layer 30 material should be chosen for good electric compliance, usually a suitably low reaction rate, with that particular embodiment of electrolyte. The ohmic contact layer 30 may be deposited onto the carbonaceous layer 32 using magnetron sputtering, thermal evaporation, or a similar process. Exemplary materials that may be used in the ohmic contact layer 30 are aluminum (Al), tantalum (Ta), and platinum (Pt). In general, a thickness of this ohmic contact layer 30 varies in the range of from about 1 nm to about 10 µm.

The electrode process structure 28 may also include a second joining layer 38. The second joining layer 38 is useful for joining the electrode base structure 26 to the electrode process structure 28. If the electrode base structure 26 and electrode process structure 28 are to be thermally bonded using moderate temperature and mechanical pressure, then a soft metal is useful for the second joining layer 38. The second joining layer 38 may be deposited onto the ohmic contact layer 30 using magnetron sputtering, thermal evaporation, or a similar process. If the conductivity of the material of the second joining layer 38 is relatively low, then its thickness should be limited to achieve suitable current handling performance. Exemplary material useful for the second joining layer 38 includes platinum (Pt), gold (Au), silver (Ag), palladium (Pd), tin (Sn), nickel (Ni), copper (Cu) or a combination of those materials. In general, a thickness of this second joining layer 38 varies between about 1 nm and about 10 µm.

The electrode base structure 26 and electrode process structure 28 may be joined at an interface between the first joining layer 36 and the second joining layer 38 by any number of methods. One example method is thermal bonding in which the two structures are simultaneously heated and pressed together. For platinum (Pt) joining layer material, a useful temperature range for thermal bonding varies from about 150 degrees Celsius to about 600 degrees Celsius.

Once the electrode base structure 26 and electrode process structure 28 are joined, the process substrate layer 35 may be removed by simple pealing or other methods to reveal the surface of the carbonaceous layer 32.

Figure 14:
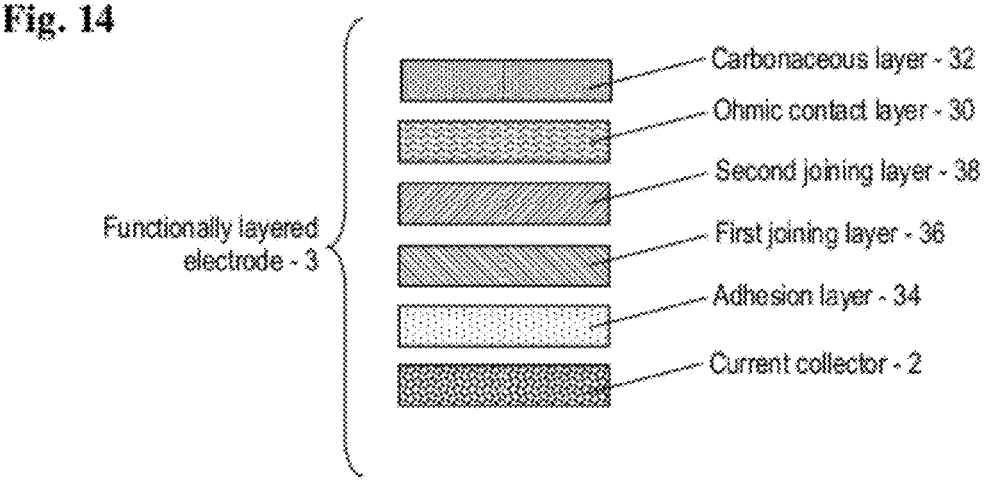
FIG. 14 is a block diagram depicting an embodiment a functionally layered electrode.

As shown in FIG. 14, an exemplary functionally layered electrode 3 includes the current collector 2, the adhesion layer 34, the first joining layer 36, the second joining layer 38, the ohmic contact layer 30, and the carbonaceous layer 32.

In further embodiments, at least one other layer may be included. For example, an ohmic contact layer may be included, and provided to enhance ohmic contact between the another bonding layer 62, the compressed CNT 81 (which also may be referred to as an "energy storage layer," an "active layer" and by other similar terms) or another layer. In another example, an adhesion layer may be included, and provided to enhance adhesion between the another bonding layer 62 and the compressed CNT 81, or another layer. Materials in the additional or optional layers may be chosen according to at least one property, such as electrical conductivity, compatibility and the like.

The functionally layered electrode 3 is generally of a layered form. The layers presented herein are not limiting of the electrode 3 and are merely for illustration. Other combinations may be practiced. Such other combinations may take into account, for example, combining an aspect of one layer with an aspect of another layer. Other aspects may be considered and some aspects may be omitted altogether. In short, a particular configuration of the electrode 3 may be determined when considering the requirements of a designer, fabricator, user and/or operator, as well as any functional limitations of the materials or processes for fabrication, or any other similar parameter(s).

Figure 15:
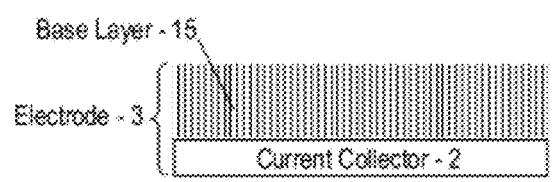
FIG. 15 is a block diagram depicting an electrode having a carbon base layer disposed onto a current collector.

A further embodiment of the electrode 3 is provided as a "multi-form" electrode 3, which is introduced as a process of fabrication that begins with FIG. 15.

Referring now to FIG. 15, an embodiment of a basic electrode 3 is shown. In this non-limiting example, the electrode 3 includes the current collector 2 which supports a base layer 15. In some embodiments, the current collector 2 is between about 0.5 micrometers (μm) to about 25 micrometers (μm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrically inert and compatible with the base layer 15. Some exemplary materials include aluminum, platinum, gold, tantalum, titanium, and may include other materials as well as various alloys.

In the exemplary embodiment, the base layer 15 is formed of vertically aligned carbon nanotubes (VACNT) 47. Non limiting examples of nanoforms of carbon that may be included in the base layer 15 include, without limitation, single wall nanotubes and multiwall nanotubes.

Figure 16:
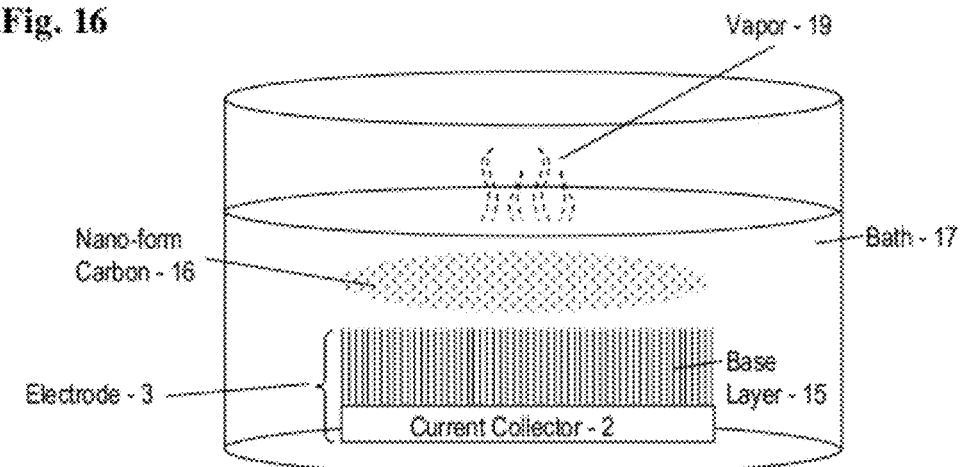
FIG. 16 is a block diagram depicting an apparatus for depositing additional carbon nano-forms onto the electrode of FIG. 15.
Figure 17:
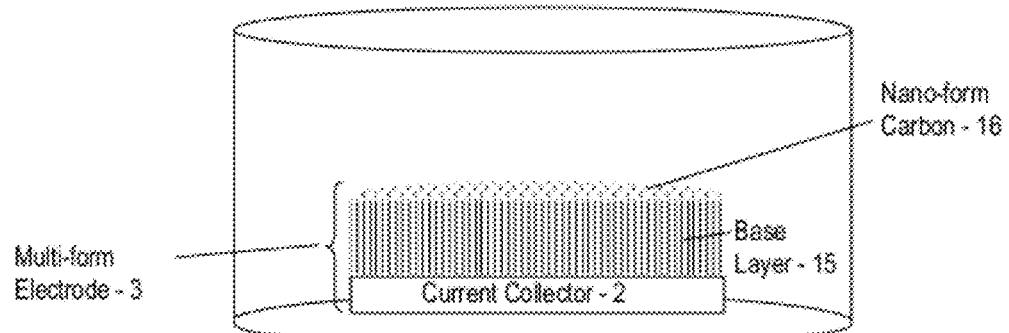
FIG. 17 is a block diagram depicting a multi-form electrode.

Referring now to FIG. 16, there are shown aspects of one embodiment for addition of nanoform carbon 16 to the base layer 15. In this example, the electrode 3 is immersed in a bath 17 of a carrier material. In some embodiments, the bath 17 includes a solvent. An addition of nanoform carbon 16 is provided, and generally suspended in the bath 17. Generally, the nanoform carbon 16 includes at least one of nanotubes, nanohorns, nano-onions, carbon black, fullerene, graphene, oxidized graphene. Once the addition has been completed, the bath 17 is removed, such as by vapor 19 and/or draining of the carrier material. This results in a multi-form electrode 3, as shown in FIG. 17. That is, the resulting electrode is referred to as the "multi-form" electrode 3 as it includes multiple nanoforms of carbon.

That is, the process of removing the bath 17 results in another layer of nanoform carbon 16 disposed upon the base layer 15. Accordingly, the multi-form electrode 3 may be fabricated in a variety of stages.

Figure 18:
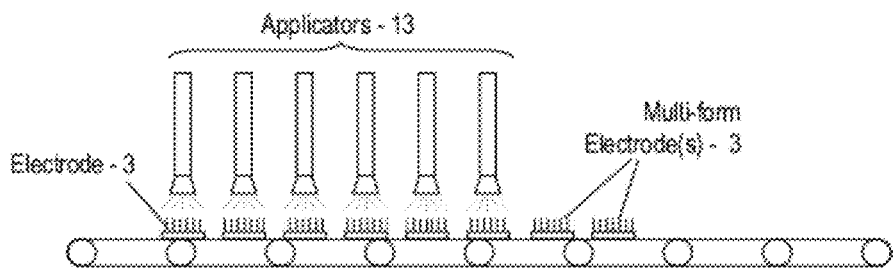
FIG. 18 is a block diagram depicting another apparatus for depositing additional carbon nano-forms onto the electrode of FIG. 15.

Another embodiment for applying nanoform carbon 16 over the base layer 15 is depicted in FIG. 18. In FIG. 18, a plurality of applicators 13 apply the nanoform carbon 16 to the base layer 15 of each electrode 3. Each of the applicators 13 may be fed the nanoform carbon 16 from one to many supplies of nanoform carbon 16. Accordingly, a variety of forms of the nanoform carbon 16 may be applied. In this example, each of the applicators 13 includes apparatus for providing an appropriate spray of the nanoform carbon 16 onto the base layer 15. Accordingly, the nanoform carbon 16 may be mixed with a solvent or other carrier material. The carrier material provides for disbursement of the nanoform carbon 16 over the base layer 15. In some embodiments, the carrier material exhibits high vapor pressure. Accordingly, the nanoform carbon 16 will quickly solidify to provide for the multiform electrode 3.

In general, it may be considered that the nanoform carbon 16 is disbursed over the base layer 15 as another layer. By applying the another layer as a mixture or solution of nanoform carbon 16 in a carrier material, certain advantages may be realized. For example, general arrangement of the nanoform carbon 16 may be, at least to some extent, controlled. For example, multiple layering may be undertaken. Concentrations of the nanoform carbon 16 may be controlled, as well as the combinations of nanoform carbon 16 used. Accordingly, certain aspects of the multi-form electrode 3 may be generally controlled (such as a density of the energy storage media 1). On a microscopic level, this may be a result of incorporation of entanglements, void space, packed space, and the like.

Other embodiments for providing nanoform carbon 16 over the base layer 15 may be used. For example, techniques used in production of paper may be used. More specifically, the nanoform carbon 16 may be mixed with the carrier material and applied over the base layer 15 in a manner similar to setting pulp.

Exemplary carrier materials include ethanol, isopropyl alchohol, deionized water, acetone, dimethylformamide (DMF), dimethylsulfoxide (DMSO) and other similar materials.

Optionally, a post fabrication treatment may be performed. Exemplary processes in post fabrication treatment include heating the multiform electrode 3. For example, the multi-form electrode 3 may be heated appropriately to substantially expel remaining carrier material from the nanoform carbon 16. Processes (such as heating) may be performed in a controlled environment, such as a substantially oxygen free environment.

Figure 19:
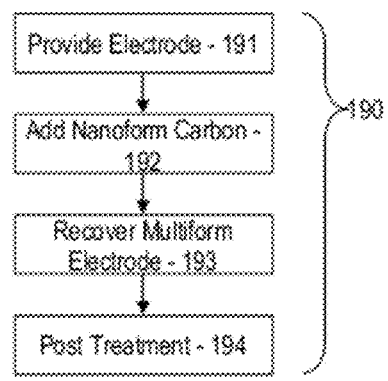
FIG. 19 is a flow chart providing an exemplary process for providing the multi-form electrode.

Referring now to FIG. 19, an exemplary process 190 for providing the multi-form electrode 3 is provided. In a first stage, a base electrode 3 is selected and provided (electrode selection 191). In a second stage, nanoform carbon 16 is applied to the base electrode 3 (nanoform application 192). In a third stage, the multi-form electrode 3 is recovered, such as from the bath 17 (electrode recovery 193). In a fourth and optional stage, post treatment of the multi-form electrode 3 is performed (electrode post-treatment 194).

A further embodiment of the electrode 3 is provided as an electrode 3 that includes a formed carbonaceous aggregate, and is introduced as a process of fabrication that begins with FIG. 20. This embodiment of the electrode 3 may also be referred to as including "sonicated" material, and therefore may be referred to as a "sonicated" electrode 3, and by other similar terms.

Figure 20A:
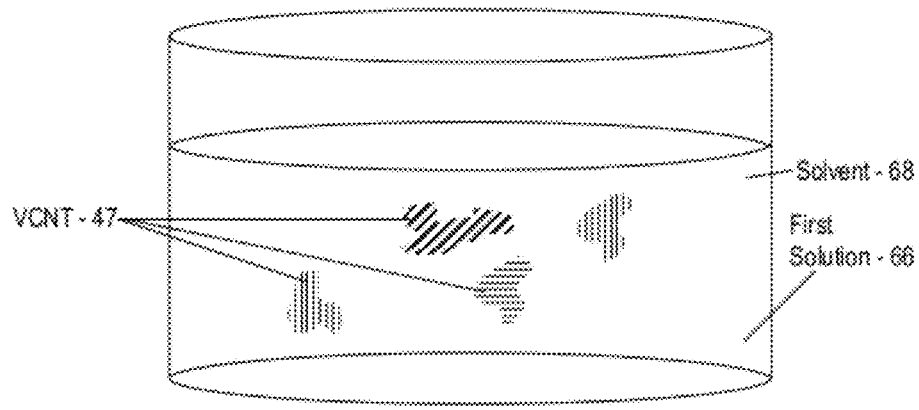
FIGS. 20A and 20B, collectively referred to herein as FIG. 20, are diagrams depicting fragments of vertically aligned carbon nanotubes and carbon additions, respectively, dispersed in a solvent.
Figure 20B:
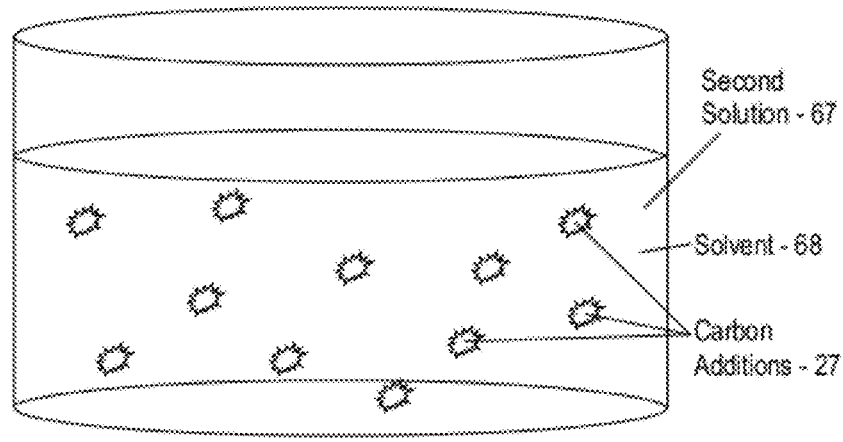

Referring now to FIGS. 20A and 20B, collectively referred to herein as FIG. 20, there are shown embodiments of a solution. In FIG. 20A a first solution 66 includes a solvent 68 and a dispersion of aggregates of the vertically aligned carbon nanotube (VCNT) 47. In FIG. 20B, a second solution 67 includes the solvent 68 with carbon additions 27 disposed therein. The carbon addition 27 includes at least one form of material that is substantially composed of carbon. Exemplary forms of the carbon addition 27 include, for example, at least one of activated carbon, carbon powder, carbon fibers, rayon, graphene, aerogel, nanohorns, carbon nanotubes and the like. While in some embodiments, the carbon addition 27 is formed substantially of carbon, it is recognized that the carbon addition 27 may include at least some impurities, either intentionally or by design. In short, the material(s) selected for the carbon addition 27 may include any materials suited for practice of the teachings herein, as deemed appropriate by a designer, manufacturer or other similarly situated person.

Generally, the solvent 68 is an anhydrous solvent, although this is not a requirement. For example, the solvent 68 may include at least one of ethanol, methonal, DMSO, DMF, acetone and the like. Generally, the dispersion of aggregates of vertically aligned carbon nanotubes 47 includes fragments of vertically aligned carbon nanotubes 47 produced by a production cycle. That is, the aggregates of vertically aligned carbon nanotubes 47 may be segmented into fragments when harvested from the substrate 65.

Figure 21:
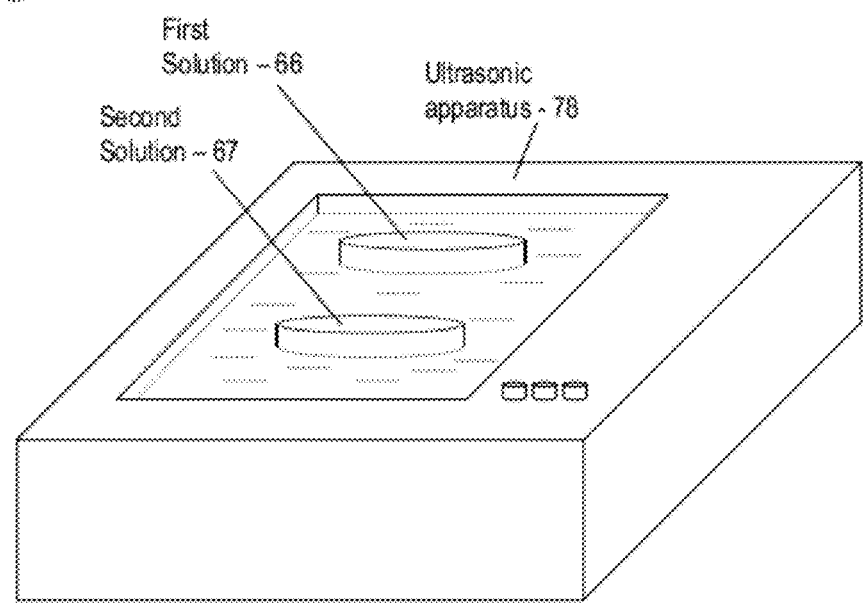
FIG. 21 is a diagram depicting ultrasonic treatment of the solutions depicted in FIG. 20.

Refer now to FIG. 21 where it is shown that each of the first solution 66 and the second solution 67 are subjected to "sonication" (physical effects realized in an ultrasonic field, provided by, for example, an ultrasonic apparatus 78). With regard to the first solution 66, the sonication is generally conducted for a period that is adequate to tease out, fluff or otherwise parse the carbon nanotubes. With regard to the second solution 67, the sonication is generally conducted for a period that is adequate to ensure good dispersion or mixing of the carbon additions within the solvent 68.

Figure 22:
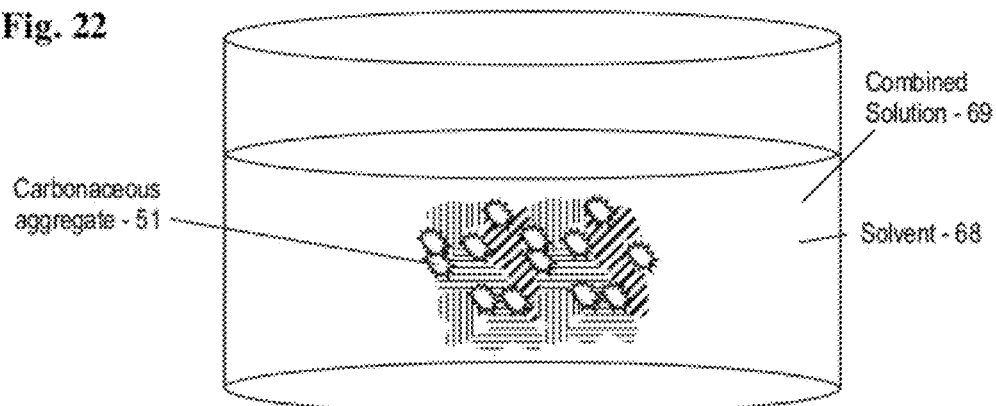
FIG. 22 depicts a carbonaceous aggregate that results from the treatment depicted in FIG. 21.

Once the first solution 66 and the second solution 67 have been adequately sonicated, the first solution 66 and the second solution 67 are then mixed together, to provide a combined solution 69 (see FIG. 22) and again sonicated. Generally, the mixture of the first solution 66 and the second solution 67 is sonicated for a period that is adequate to ensure good mixing of the aggregates of vertically aligned carbon nanotube (VCNT) 47 with the carbon addition 27. This second mixing results in a carbonaceous aggregate 51.

Figure 23:
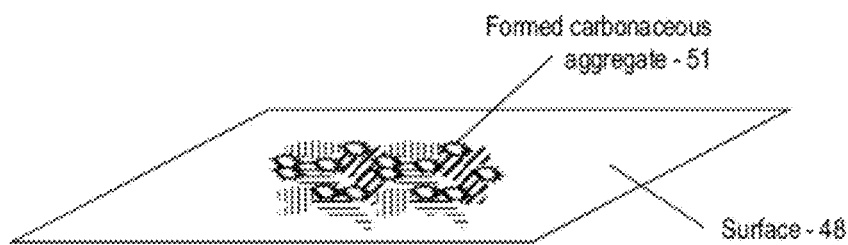
FIG. 23 depicts an embodiment of treating the carbonaceous aggregate depicted in FIG. 22.

The carbonaceous aggregate 51 may then be withdrawn from the combined solution 69 and processed. As shown in FIG. 23, the carbonaceous aggregate 51 may be formed to provide a formed carbonaceous aggregate 51. This process may be aided by disposing the carbonaceous aggregate 51 onto an appropriate surface 48. While any material deemed appropriate may be used for the surface 48, exemplary material includes PTFE as subsequent removal from the surface is facilitated by the properties thereof.

In some embodiments, the carbonaceous aggregate 51 is formed in a press to provide a formed carbonaceous aggregate 51 that exhibits a desired thickness, area and density. These embodiments are useful for, among other things, providing embodiments of the electrode 3 for the ultracapacitor 10.

Figure 24:
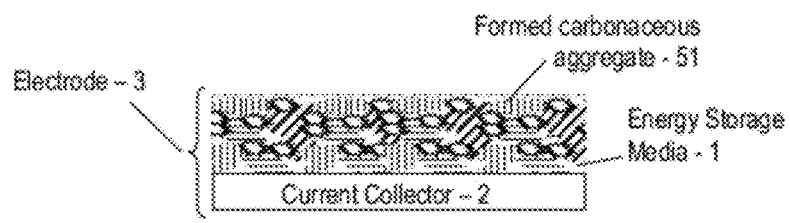
FIG. 24 depicts the treated carbonaceous aggregate of FIG. 23 disposed in an electrode that is suited for use in the ultracapacitor of FIG. 1.

Refer to FIG. 24 where an embodiment of the electrode 3 is shown. In this example, the electrode 3 includes energy storage media 1 that is fabricated from the formed carbonaceous aggregate 51. The current collector 2 shown may be coupled to the formed carbonaceous aggregate 51 through a variety of techniques, including, for example, by deposition of the current collector 2 onto the formed carbonaceous aggregate 51.

Having thus disclosed aspects of formed carbonaceous aggregate 51, additional aspects are provided. In summary, fabrication of each instance of the energy storage media 1 generally begins with suspension of fragments of vertically aligned carbon nanotube (VCNT) 47 in solvent 68. The suspension is then "sonicated" or gently mixed using, for example, a conventional ultrasonic apparatus 78. In some embodiments, other forms of carbon are separately sonicated in solvent 68, while in other embodiments, other forms of carbon are later added to the solution that includes the VCNT 47. These latter embodiments present advantages in that a limited amount of solvent 68 may be used.

The VCNT 47 and additional carbon forms are mixed via an ultrasonic field. After an appropriate interval, the VCNT 47 and the various forms of carbon in the suspension aggregate into a foam-like carbonaceous material. The foam is then withdrawn from the solvent 68 and may then be dried, flattened, compressed, heated, treated or formed in any one or more of a variety of ways to provide for the energy storage media 1.

Generally, the VCNT 47 include comparatively long nanotubes (for example, greater than about 300 μm). The various forms of carbon additions may include at least one of activated carbon, carbon fibers, rayon, graphene, aerogel, nanohorns, carbon nanotubes and the like. The additions of carbon nanotubes may include multiwall carbon nanotubes (MWNT) and single walled carbon nanotubes (SWNT). Generally, nanotubes that are included in the carbon additions are comparatively shorter than the nanotubes in the VCNT 47.

A further embodiment of the electrode 3 includes techniques for assembling a plurality of electrode elements into a larger electrode 3. As an introduction, a description of the techniques are provided, beginning with FIG. 25. It should be noted that while the embodiments disclosed with regards to FIGS. 25 through 31 include techniques for assembling a plurality of electrode elements into a larger electrode 3, that additional aspects are included.

Figure 25:
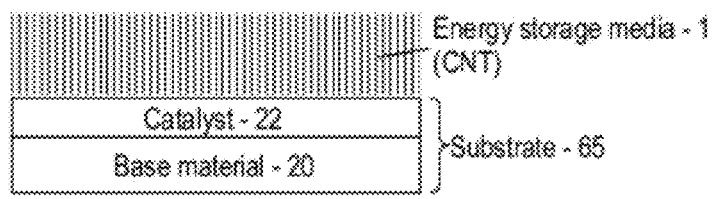
FIG. 25 is a block diagram depicting a plurality of carbon nanotubes (CNT) grown onto a substrate.

Referring now to FIG. 25, a substrate 65 that is host to carbon nanotube aggregate (VCNT) 47 is shown. In the embodiment shown in FIG. 25, the substrate 65 includes a base material 49 with a thin layer of a catalyst 46 disposed thereon.

In general, the substrate 65 is at least somewhat flexible (i.e., the substrate 65 is not brittle), and is fabricated from components that can withstand environments for deposition of the energy storage media 1 (e.g., VCNT) (e.g., a high-temperature environment of between about 400 degrees Celsius to about 1,100 degrees Celsius). However, a variety of materials may be used for the substrate 65, as determined appropriate.

Figure 26:
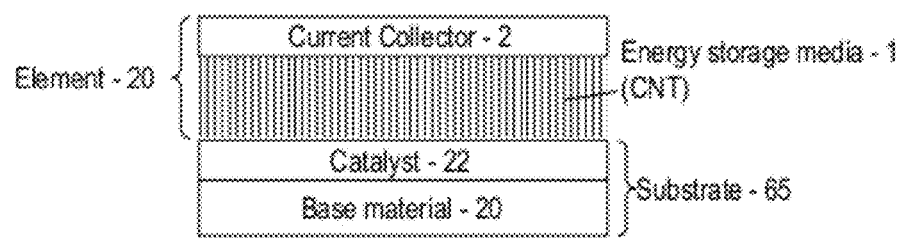
FIG. 26 is a block diagram depicting deposition of a current collector onto the CNT of FIG. 25 to provide an electrode element.

Refer now to FIG. 26. Once the energy storage media 1 (e.g., CNT) have been fabricated on the substrate 65, the current collector 2 is disposed thereon. In some embodiments, the current collector 2 is between about 0.5 micrometers (μm) to about 25 micrometers (μm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrically inert and compatible with the energy storage media 1 (e.g., CNT 47). Some exemplary materials include aluminum, platinum, gold, tantalum, titanium, and may include other materials as well as various alloys.

Once the current collector 2 is disposed onto the energy storage media 1 (e.g., CNT), an electrode element 20 is realized. Each electrode element 20 may be used individually as an electrode 3, or may be coupled (i.e., joined) to at least another electrode element 20 to provide for the electrode 3.

Figure 27:
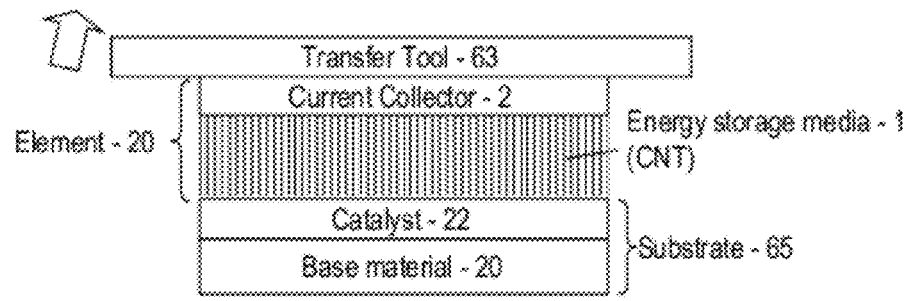
FIG. 27 is a block diagram depicting addition of transfer tape to the electrode element of FIG. 25.

Optionally, before the current collector 2 has been fabricated according to a desired standard, post-fabrication treatment is undertaken. Exemplary post-treatment includes heating and cooling of the energy storage media 1 (e.g., CNT) in a slightly oxidizing environment. Subsequent to fabrication (and optional post-treatment), a transfer tool is applied to the current collector 2. Reference may be had to FIG. 27.

FIG. 27 illustrates application of transfer tool 63 to the current collector 2. In this example, the transfer tool 63 is a thermal release tape, used in a "dry" transfer method. Exemplary thermal release tape is manufactured by NITTO DENKO CORPORATION of Fremont, Calif. and Osaka, Japan. One suitable transfer tape is marketed as REVALPHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 20.

In another process, referred to as a "wet" transfer method, tape designed for chemical release may be used. Once applied, the tape is then removed by immersion in a solvent. The solvent is designed to dissolve the adhesive.

In other embodiments of the transfer tool 63, suction is applied to the current collector 2. The suction may be applied, for example, through a slightly oversized paddle having a plurality of perforations for distributing the suction. In another example, the suction is applied through a roller having a plurality of perforations for distributing the suction. Suction driven embodiments (i.e., pneumatic tools) offer advantages of being electrically controlled and economic as consumable materials are not used as a part of the transfer process. Other embodiments of the transfer tool 63 may be used.

Figure 28:
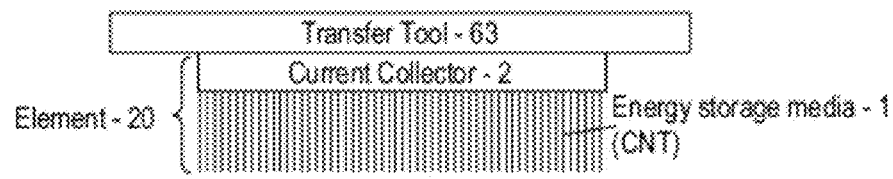
FIG. 28 is a block diagram depicting the electrode element during a transfer process.

Once the transfer tool 63 has been temporarily coupled to the current collector 2, the electrode element 20 is gently removed from the substrate 65 (see FIGS. 27 and 28). The removal generally involves peeling the energy storage media 1 (e.g., CNT 47) from the substrate 65, beginning at one edge of the substrate 65 and energy storage media 1 (e.g., CNT 47).

Figure 29:
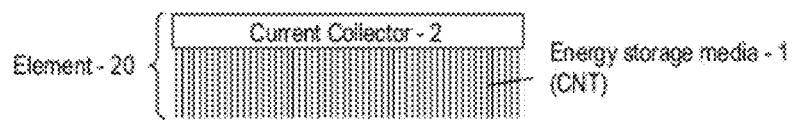
FIG. 29 is a block diagram depicting the electrode element subsequent to transfer.

Subsequently, the transfer tool 63 may be separated from the electrode element 20 (see FIG. 29). In some embodiments, the transfer tool 63 is used to install the electrode element 20. For example, the transfer tool 63 may be used to place the electrode element 20 directly onto the separator 5. In general, once removed from the substrate 65, the electrode element 20 is available for use.

Figure 30:
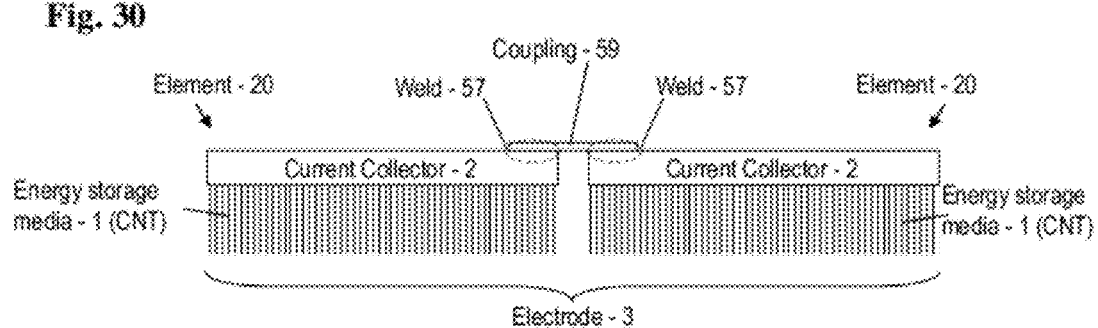
FIG. 30 is a block diagram depicting an exemplary electrode fabricated from a plurality of the electrode elements.

In instances where a large electrode 3 is desired, a plurality of the electrode elements 20 may be joined together. Reference may be had to FIG. 30. As shown in FIG. 30, a plurality of the electrode elements 20 may be joined by, for example, coupling a coupling 59 to each electrode element 20 of the plurality of electrode elements 20. The mated electrode elements 20 provide for another embodiment of the electrode 3.

In some embodiments, the coupling 59 is coupled to each of the electrode elements 20 at a weld 57. Each of the welds 57 is provided as an ultrasonic weld 57. It has been found that ultrasonic welding techniques are particularly well suited to providing each weld 57. That is, in general, the aggregate of energy storage media 1 (e.g., CNT 47) is not compatible with welding, where only a nominal current collector 2, such as disclosed herein is employed. As a result, many techniques for joining electrode elements 20 are disruptive, and damage the element 20. However, in other embodiments, other forms of coupling are used, and the coupling 59 includes a bond, a crimp or other such type of connection.

The coupling 59 may be a foil, a mesh, a plurality of wires or may be realized in other forms. Generally, the coupling 59 is selected for properties such as conductivity and being electrochemically inert. In some embodiments, the coupling 59 is fabricated from the same material(s) as are present in the current collector 2.

In some embodiments, the coupling 59 is prepared by removing an oxide layer thereon. The oxide may be removed by, for example, etching the coupling 59 before providing the weld 57. The etching may be accomplished, for example, with KOH.

The electrode 3 may be used in a variety of applications. For example, the electrode 3 may be rolled up into a "jelly roll" type of energy storage.

Figure 31:
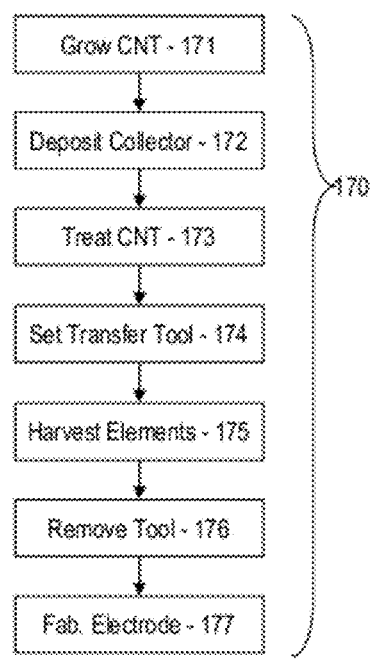
FIG. 31 is a flow chart depicting an exemplary process for fabricating the electrode from a plurality of the electrode elements.

Referring now to FIG. 31, an exemplary method 170 for fabricating the electrode is provided. In this exemplary method 170, a first step calls for growing CNT 171. A second step involves depositing the current collector 172 onto the aligned CNT aggregate. A third, optional, step involves CNT post-treatment 173 to facilitate removal from the substrate. A fourth step setting the transfer tool 174 onto the current collector, and in a fifth step, electrode element harvesting 175 from the substrate. In a sixth step, removing the transfer tool 176 from the electrode element is performed. In a seventh step, joining of electrode elements 177 together to provide a larger, high power electrode.

A further embodiment of the electrode 3 includes techniques for assembling the electrode 3 and performing various post-assembly treatments to provide a "densified" electrode 3, or an electrode 3 that exhibits "densification." With regard to the techniques for providing a densified electrode 3, reference may be had generally to prior figures in order to ascertain an understanding of the techniques.

Techniques for densification of the electrode 3 include aspects of some of the foregoing embodiments. In an example of densification, a plurality of layers of CNT 47 are removed from each of their respective substrates 65. Each of the layers of CNT 47 are removed, for example, by techniques such as those described above (e.g., by use of a thermal release tape, a blade, a pneumatic tool and by other such techniques).

Each of the layers of CNT 47 is then placed into a stack, to provide a layered stack of CNT 47. Reference may be had to FIG. 9, and the techniques discussed in relation thereto. Once the layered stack of CNT 47 is assembled, the layered stack of CNT 47 is then wetted. The wetting may be provided with a solution such as, for example, a solvent. Exemplary embodiments of solvent include isopropyl alcohol, deionized water, acetone, dimethylformamide (DMF), dimethylsulfoxide (DMSO), suitable combinations, and any other suitable or similar materials.

Wetting may be accomplished with a suitable spray, a bath, or by other similar techniques as deemed appropriate.

Once the layered stack of CNT 47 is appropriately wetted, the layered stack of CNT 47 is then compressed. Once exemplary tool for providing suitable compression is a "calendar" machine (i.e., a machine with opposing rollers). Subsequently, remaining solvent in the layered stack of CNT 47 is removed through evaporation, drawn out in a vacuum, or by other similar techniques. Heating of the layered stack of CNT 47 may be employed to encourage expulsion of the solvent.

Once dried, the resulting compressed layered stack of CNT 47 is generally flexible and mechanically robust. Generally, the current collector 2 is applied to the compressed layered stack of CNT 47 at this point in the process (however, this is not required, as the current collector 2 may be applied during layering, for example). In some embodiments, the current collector 2 is deposited onto the compressed layered stack of CNT 47 by use of chemical vapor deposition (CVD), sputtering, e-beam, thermal evaporation or through another suitable technique.

In another embodiment, a solution of solvent and nanoforms of carbon is interspersed between the layers of CNT 47.

The resulting electrode 3 exhibits a high energy density. Generally, increasing the number of layers of CNT 47 results in increases in the energy density. The resulting electrode 3 also exhibits a high power density, even when ionic liquids are used (in the ultracapacitor 10 that incorporates the resulting electrode 3).

Aspects of performance for an exemplary ultracapacitor are now provided. In some embodiments, a total weight of the ultracapacitor was 2.25 mg, and a total volume of the ultracapacitor was 2 cc. Gravimetric peak power density was calculated according to the formulae of Eqs. (1) and (2):

$$Vm^2/(4*R*W) \qquad \text{Eq. (1); and}$$

$$Vm^2/(4*R*V) \qquad \text{Eq. (2);}$$

where: Vm=rated voltage, R=equivalent series resistance (ESR), W=total weight, and V=total volume.

In summary, the techniques disclosed result in a robust energy storage system. Performance data depicting power density for the exemplary embodiment of the ultracapacitor 10 are provided in Table 1, and are also depicted in FIG. 32.

TABLE 1

Power Density Performance Data

| | |
|---|---|
| Resistance 3 dB: | 42.2 mΩ |
| Equivalent Series Resistance 1 kHz: | 17.4 mΩ |
| Peak Power 3 dB | 47 kW/l |
| | 42.1 kW/kg |
| Peak Power 1 kHz | 114 kW/l |
| | 102 kW/kg |

Figure 32A:
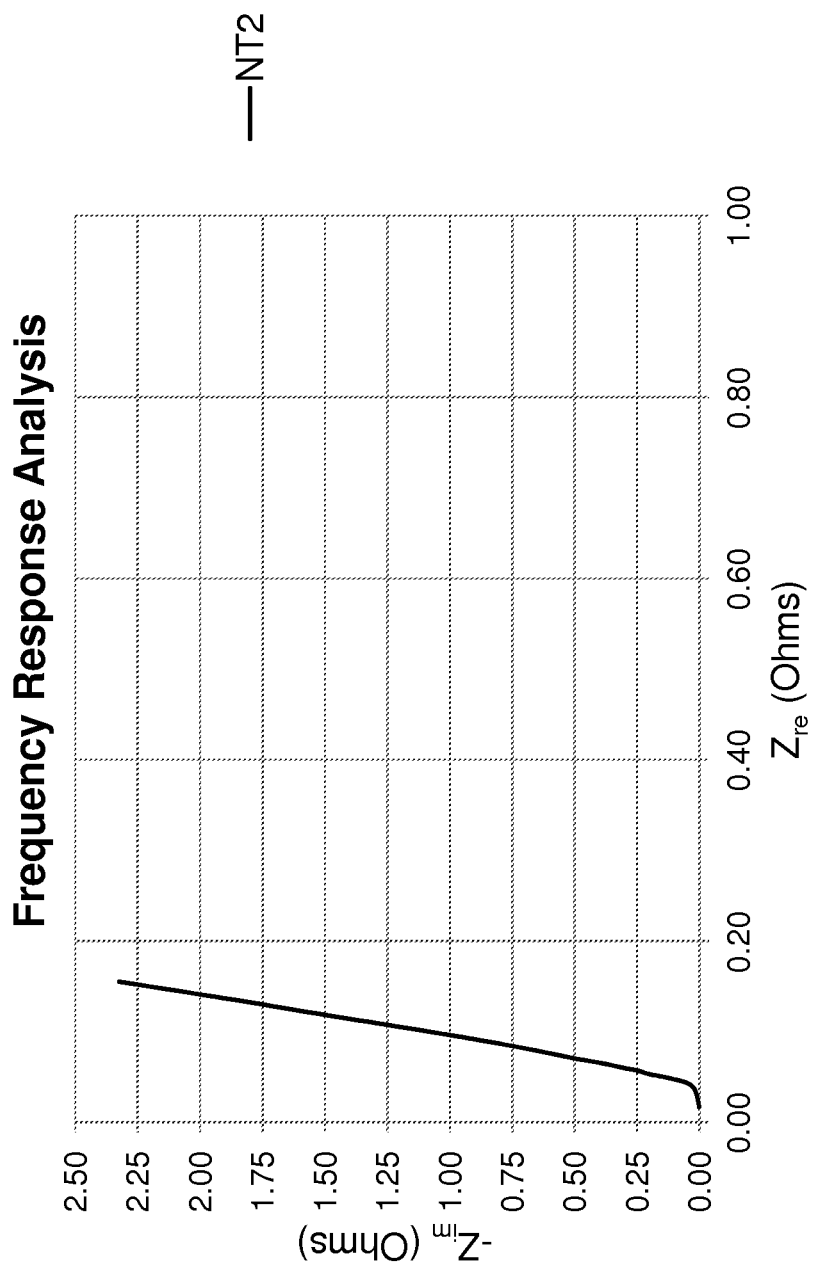
FIGS. 32A and 32B, collectively referred to herein as FIG. 32, are graphs depicting power density as a function of frequency response for an exemplary embodiment of an ultracapacitor that includes electrodes fabricated according to the teachings herein.
Figure 32B:
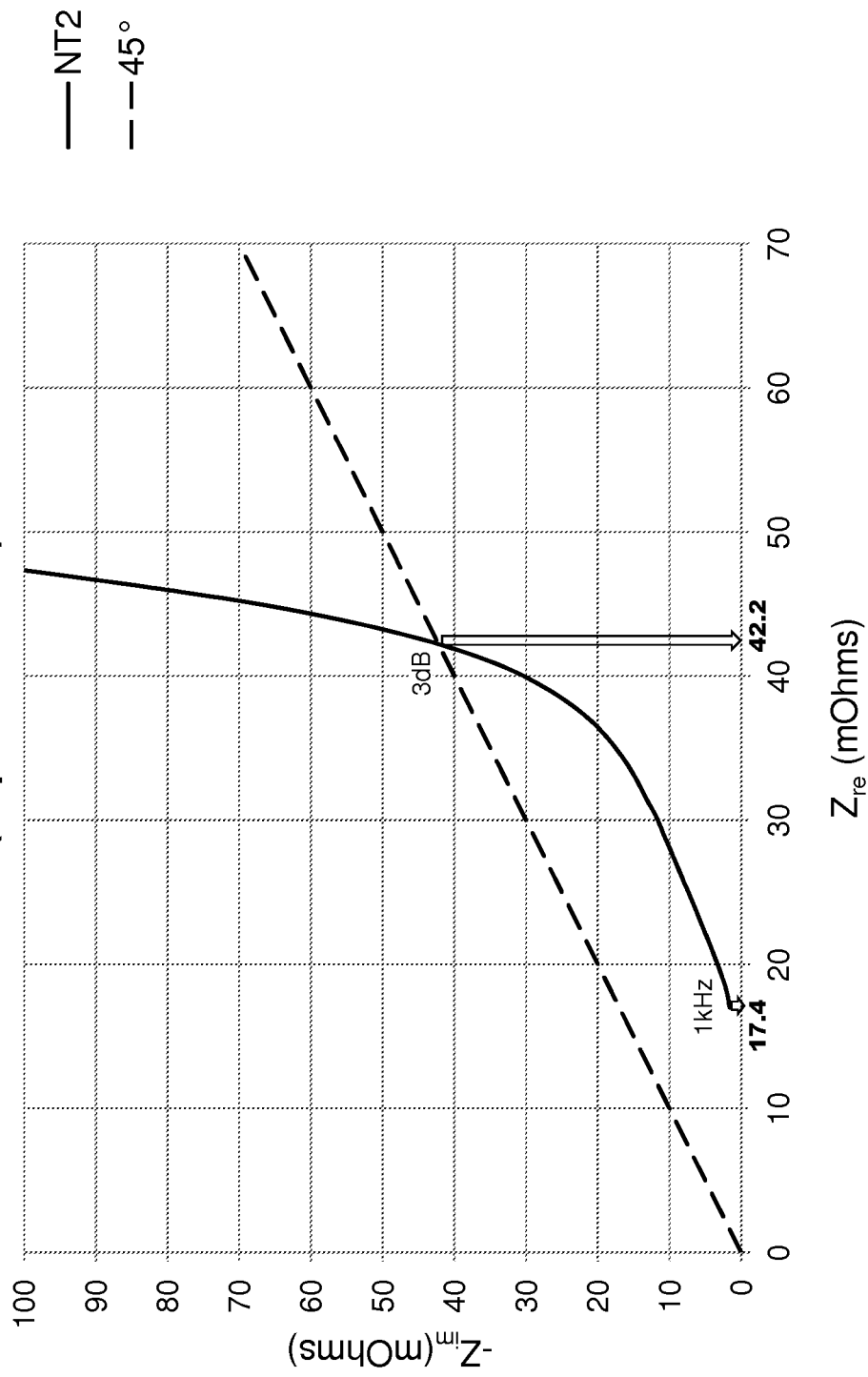

FIGS. 32A and 32B, collectively referred to herein as FIG. 32, are graphs depicting power density as a function of frequency response of an embodiment of an ultracapacitor that includes electrodes fabricated according to the teachings herein. FIG. 32B provides a blow-up of an initial part of the curve provided in FIG. 32A.

Figure 33:
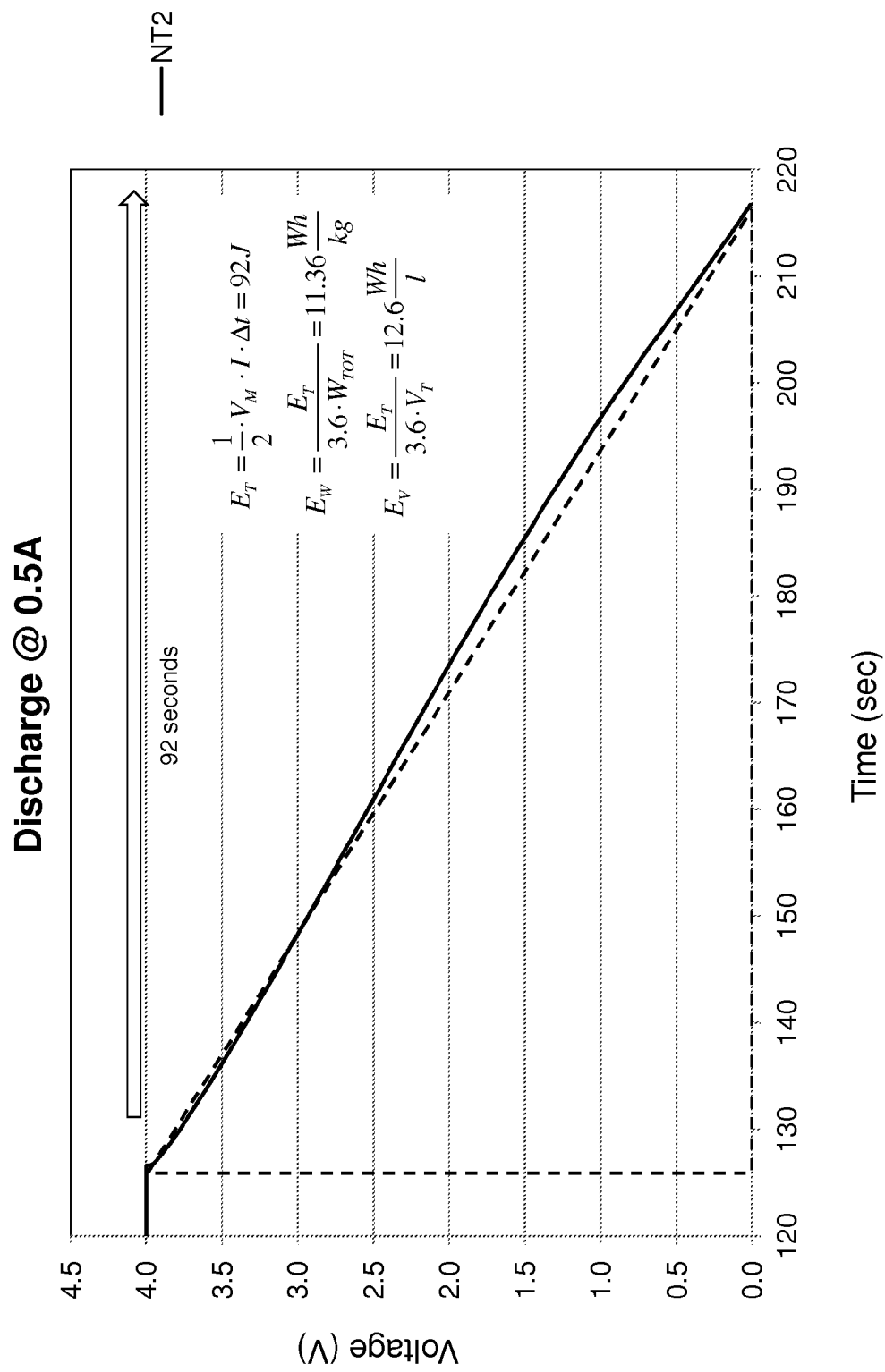
FIG. 33 is a graph depicting voltage response of a discharge cycle for the exemplary ultracapacitor.

FIG. 33 depicts voltage response for discharge of the exemplary ultracapacitor. The discharge curve was evaluated with a draw of 0.5 A. Further aspects of the discharge evaluation are provided in Table 2.

TABLE 2

Voltage Discharge Data

| | |
|---|---|
| Discharging current: | 0.5 A |
| Maximum Voltage: | 4 V |
| Discharge time: | 92 s |
| Cycles shown: | 1/2 |
| Cycles performed: | >2000 |
| Energy Density:: | 12.6 Wh/l, 11.4 Wh/kg |

Figure 34:
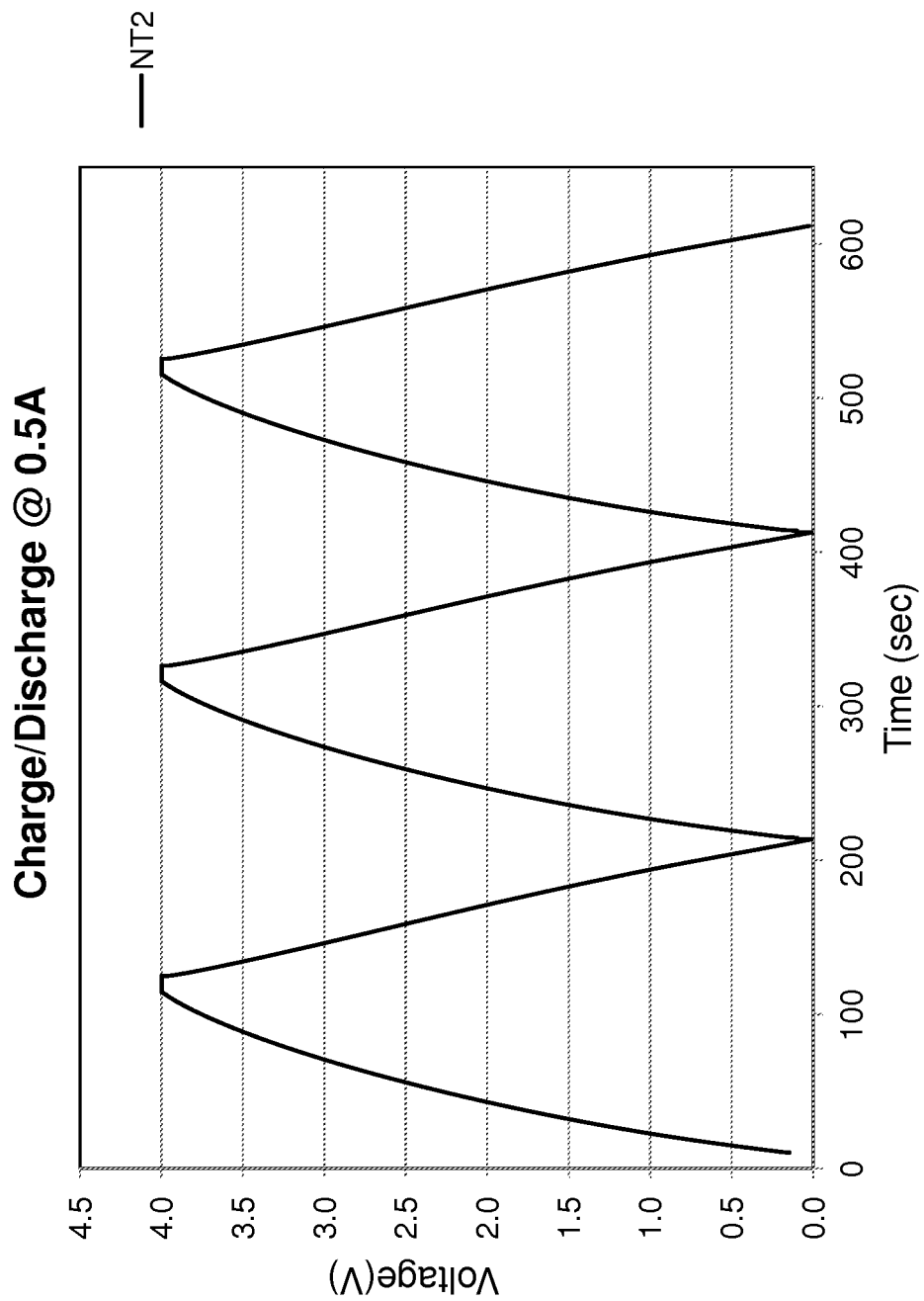
FIG. 34 is a graph depicting voltage response for charge and discharge cycling of the exemplary ultracapacitor.

FIG. 34 depicts voltage response for charge/discharge cycling of the exemplary ultracapacitor. Further aspects of the discharge evaluation are provided in Table 3.

TABLE 3

Charge/Discharge Cycling Data

| | |
|---|---|
| Charging/discharging current: | 0.5 A |
| Maximum voltage: | 4 V |
| Charge time: | 92 s |
| Discharge time: | 92 s |
| Cycles shown: | 3 |
| Cycles performed: | >2000 |
| Energy density: | 12.6 Wh/l, 11.4 Wh/kg |

Having thus disclosed various embodiments, it should be understood that by changing the loading of the energy storage media (i.e, a weight of carbonaceus material disposed on the current collector) power density and energy density of the ultracapacitor 10 may be controlled.

That is, the higher a weight ratio of energy storage media to total weight (of the ultracapacitor), the higher the energy density becomes. Power density, in contrast, substantially depends on the Euclidean surface area of the electrode. Therefore, the lower the weight ratio of energy storage media to total weight (of the ultracapacitor), the higher power density becomes (as the total weight of the ultracapacitor is lower whereas the total surface area of the electrode is unchanged).

In some embodiments, loading of the energy storage media can vary from 0.1 mg/cm$^2$ to 30 mg/cm$^2$. If the loading of the energy storage media is 0.1 mg/cm$^2$ the ultracapacitor will show very high power density, such as in excess of about 250 kW/kg, in which case the energy density will be about 1 Wh/kg. If the loading of the energy storage media is 30 mg/cm$^2$ the device will show very high energy density, such as in excess of 30 Wh/kg, in which case the power density will be about 12 kW/kg.

Figure 35:
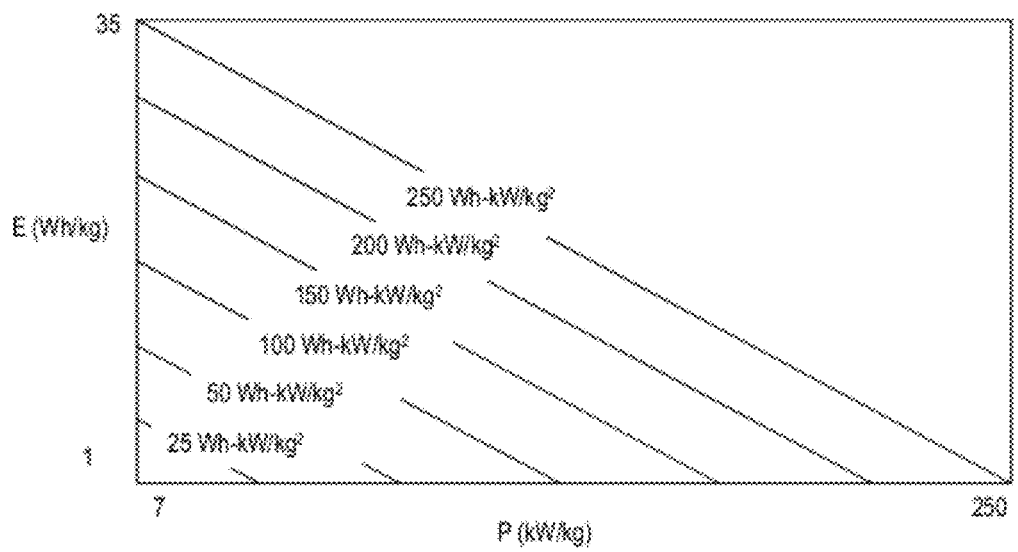
FIGS. 35 and 36 depict combined power and energy performance for a series of exemplary ultracapacitors.
Figure 36:
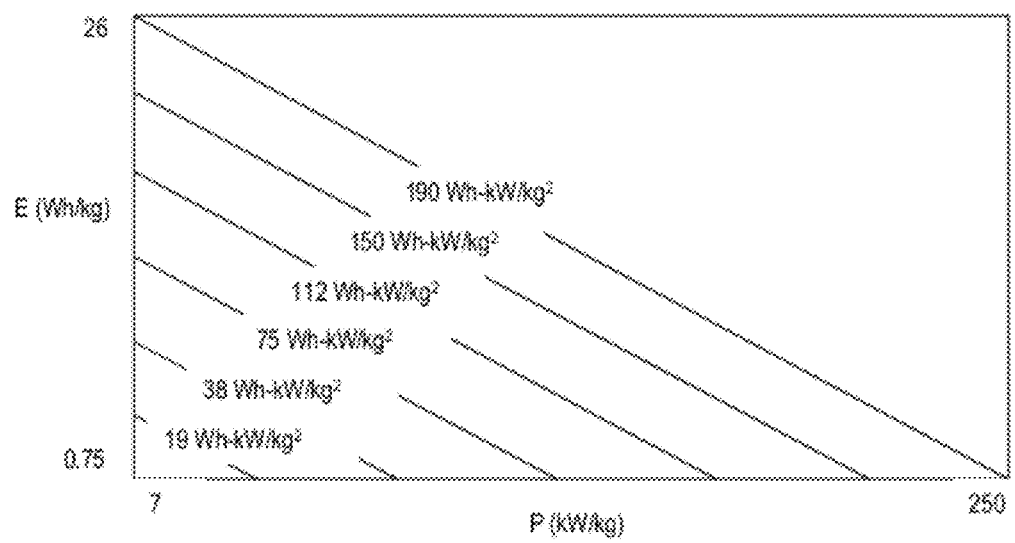

Performance of the ultracapacitor, in terms of combined power and energy output, is provided in FIGS. 35 and 36.

As a matter of convention, it should be considered that the term "may" as used herein is to be construed as optional; "includes" is to be construed as not excluding other options (i.e., steps, materials, components, compositions, etc, . . . ); "should" does not imply a requirement, rather merely an occasional or situational preference. Other similar terminology is likewise used in a generally conventional manner.

In general, power output and energy output may be expressed herein in various formats. For example, power density may be expressed as kW/kg. Similarly, energy density may be expressed as Wh/kg. In both cases, the mass used to normalize output is that of the energy storage (e.g., the ultracapacitor) evaluated. Alternative expressions of power density and energy density may be used, and may consider, for example, a volume of the energy storage.

While the invention has been described with reference to exemplary embodiments, it will be understood by those skilled in the art that various changes may be made and equivalents may be substituted for elements thereof without departing from the scope of the invention. Many modifications will be appreciated by those skilled in the art to adapt a particular arrangement or material to the teachings of the invention without departing from the essential scope thereof.

It should be recognized that the teachings herein are merely illustrative and are not limiting of the invention. Further, one skilled in the art will recognize that additional components, configurations, arrangements and the like may be realized while remaining within the scope of this invention. For example, configurations of layers, content of layers and the like may be varied from embodiments disclosed herein. Layers may be added, given additional functionality, reduced functionality, and some layers may be omitted. Generally, design and/or applications of the electrode and ultracapacitors making use of the electrodes are limited only by the needs of a system designer, manufacturer, operator and/or user and demands presented in any particular situation.

Further, various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

In the present application a variety of variables are described, including but not limited to components (e.g. electrode materials, electrolytes, etc.), conditions (e.g., temperature, freedom from various impurities at various levels), and performance characteristics (e.g., post-cycling capacity as compared with initial capacity, low leakage current, etc.). It is to be understood that any combination of any of these variables can define an embodiment of the invention. E.g., the combination of a particular electrode material, with a particular electrolyte, under a particular temperature range and with impurity less than a particular amount, operating with post-cycling capacity and leakage current of particular values, where those variables are included as possibilities but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:
1. An ultracapacitor comprising:
  a housing comprising at least one multi-form electrode disposed therein;
  the multi-form electrode comprising a first layer comprising elongated nanoform material disposed over a current collector, and at least a second layer comprising nanoform carbon disposed over the first layer and
  an electrolyte for providing ionic transport within the ultracapacitor;
  wherein the ultracapacitor is configured to have a gravimetric output power density of at least about 12 kW/kg for a plurality of charge-discharge cycles.
2. The ultracapacitor as in claim 1, wherein a housing for the ultracapacitor is one of a prismatic and cylindrical form.
3. The ultracapacitor of claim 1, wherein the electrolyte comprises at least one of:
  1-(3-cyanopropyl)-3-methylimidazolium, 1,2-dimethyl-3-propylimidazolium, 1,3-bis(3-cyanopropyl)imidazoliu, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 3-methyl-1-propylpyridinium, and a combinations thereof.
4. The ultracapacitor of claim 1, wherein the electrolyte comprises at least one of:
  bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof.
5. The ultracapacitor of claim 1, wherein the nanoform carbon comprises at least one of:
  single wall nanotubes, multiwall nanotubes, nanohorns, nano-onions, carbon black, fullerene, graphene, oxidized graphene, metal nano-particles, metal oxide nano-particles, at least one form of conductive polymer and treated forms of the foregoing.
6. The ultracapacitor of claim 1, wherein the electrolyte comprises at least one of:
  acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof.
7. The ultracapacitor of claim 1, wherein:
  the elongated nanoform material comprises carbon nanotubes.
8. The ultracapacitor of claim 7, wherein the ultracapacitor is configured to have a gravimetric output power density of at least about 250 kW/kg for a plurality of charge-discharge cycles.
9. The ultracapacitor of claim 8, wherein the ultracapacitor is configured to have a gravimetric output power density of at least about 1 Wh/kg for the plurality of charge-discharge cycles.
10. The ultracapacitor of claim 9, wherein the plurality of charge-discharge cycles comprises at least 1,000 cycles.
11. The ultracapacitor of claim 9, wherein the plurality of charge-discharge cycles comprises at least 2,000 cycles.
12. The ultracapacitor of claim 7, wherein the ultracapacitor is configured to operate at a voltage of at least half a maximum rated voltage with a gravimetric output power density and gravimetric output energy density having a product equal to at least 19 Wh-kW/kg$^2$.
13. The ultracapacitor of claim 12, wherein the maximum rated voltage is at least about 4V.
14. The ultracapacitor of claim 7, wherein the ultracapacitor is configured to operate at a voltage of at least half a maximum rated voltage with a gravimetric output power density and gravimetric output energy density having a product equal to at least 38 Wh-kW/kg$^2$.
15. The ultracapacitor of claim 14, wherein the maximum rated voltage is at least about 4V.
16. The ultracapacitor of claim 7, wherein the ultracapacitor is configured to operate at a voltage of at least half a maximum rated voltage with a gravimetric output power density and gravimetric output energy density having a product equal to at least 75 Wh-kW/kg$^2$.
17. The ultracapacitor of claim 16, wherein the maximum rated voltage is at least about 4V.
18. The ultracapacitor of claim 7, wherein the ultracapacitor is configured to operate at a voltage of at least half a maximum rated voltage with a gravimetric output power density and gravimetric output energy density having a product equal to at least 112 Wh-kW/kg$^2$.

19. The ultracapacitor of claim 18, wherein the maximum rated voltage is at least about 4V.

20. The ultracapacitor of claim 7, wherein the ultracapacitor is configured to operate at a voltage of at least half a maximum rated voltage with a gravimetric output power density and gravimetric output energy density having a product equal to at least 150 Wh-kW/kg$^2$.

21. The ultracapacitor of claim 20, wherein the maximum rated voltage is at least about 4V.

22. The ultracapacitor of claim 7, wherein the ultracapacitor is configured to operate at a voltage of at least half a maximum rated voltage with a gravimetric output power density and gravimetric output energy density having a product equal to at least 190 Wh-kW/kg$^2$.

23. The ultracapacitor of claim 22, wherein the maximum rated voltage is at least about 4V.

24. The ultracapacitor of claim 7, comprising an energy storage media comprising the first and second layers and having an areal density in the range of 0.1 mg/cm$^2$ to 30 mg/cm$^2$.

25. The ultracapacitor of claim 7, wherein the electrolyte comprises an cation comprising at least one from list consisting of: imidazolium, pyrazinium, piperidinium, pyridinium, pyrimidinium, and pyrrolidinium.

26. The ultracapacitor of claim 1, wherein the electrolyte comprises an anion comprising at least one from list consisting of: bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, and trifluoro(trifluoromethyl)borate.

27. The ultracapacitor of claim 7, wherein the multiform electrode comprises a current collector comprising aluminum.

28. The ultracapacitor of claim 7, wherein the elongated nanoform material consists essentially of carbon nanotubes.

29. The ultracapacitor of claim 7, wherein:
the first layer comprises a layer of aligned carbon nanotubes.

30. The ultracapacitor of claim 7, wherein:
the first layer comprises a compressed layer of carbon nanotubes.

31. The ultracapacitor of claim 7, wherein:
the first layer comprises a layer of vertically aligned carbon nanotubes extending in a direction transverse to a major surface of the current collector.

32. The ultracapacitor of claim 7, wherein the second layer is substantially free from carrier material used to apply the second layer to the first layer.

33. The ultracapacitor of claim 32, wherein the carrier material comprises at least one selected from the list consisting of: ethanol, isopropyl alchohol, deionized water, acetone, dimethylformamide (DMF), dimethylsulfoxide (DMSO), and combinations thereof.

34. The ultracapacitor of claim 32, wherein the second layer is substantially free from oxygen based impurities.

35. The ultracapacitor of claim 7, wherein the second layer comprises nanohorns.

36. The ultracapacitor of claim 7, wherein the second layer comprises nano-onions.

37. The ultracapacitor of claim 7, wherein the second layer comprises carbon black.

38. The ultracapacitor of claim 7, wherein the second layer comprises fullerene.

39. The ultracapacitor of claim 7, wherein the second layer comprises graphene.

40. The ultracapacitor of claim 7, wherein the second layer comprises oxidized graphene.

41. The ultracapacitor of claim 7, wherein the second layer comprises metal nano-particles.

42. The ultracapacitor of claim 7, wherein the second layer comprises metal oxide nano-particles.

43. The ultracapacitor of claim 7, wherein the second layer comprises a form of conductive polymer.

44. The ultracapacitor of claim 7, wherein the second layer comprises a single wall carbon nanotubes.

45. The ultracapacitor of claim 7, wherein the second layer comprises a multi-wall carbon nanotubes.

46. The ultracapacitor of claim 1, wherein the ultracapacitor is configured to have a gravimetric output power density of at least about 30 Wh/kg for the plurality of charge-discharge cycles.

47. The ultracapacitor of claim 46, wherein the plurality of charge-discharge cycles comprises at least 1,000 cycles.

48. The ultracapacitor of claim 46, wherein the plurality of charge-discharge cycles comprises at least 2,000 cycles.

* * * * *